United States Patent
Keys et al.

(10) Patent No.: US 7,634,488 B2
(45) Date of Patent: Dec. 15, 2009

(54) REMOTE DISTRIBUTION/INSTALLATION UTILITY AND ASSOCIATED METHOD OF DEPLOYING EXECUTABLE CODE

(75) Inventors: Gregory Keys, Warwick, NY (US);
Hiroshi Kitada, Tuckahoe, NY (US);
Lana Wong, Randolph, NJ (US)

(73) Assignees: Ricoh Company, Ltd., Tokyo (JP);
Ricoh Americas Corporation, West Caldwell, NJ (US)

( * ) Notice: Subject to any disclaimer, the term of this patent is extended or adjusted under 35 U.S.C. 154(b) by 269 days.

(21) Appl. No.: 11/559,254

(22) Filed: Nov. 13, 2006

(65) Prior Publication Data

US 2008/0114860 A1    May 15, 2008

(51) Int. Cl.
*G06F 17/30* (2006.01)
*G06F 7/00* (2006.01)

(52) U.S. Cl. .................. 707/101; 707/104.1; 707/10; 707/204

(58) Field of Classification Search ............. 707/101, 707/104.1, 10, 204
See application file for complete search history.

(56) References Cited

U.S. PATENT DOCUMENTS

| | | | |
|---|---|---|---|
| 6,714,992 B1 * | 3/2004 | Kanojia et al. | 719/321 |
| 6,845,396 B1 * | 1/2005 | Kanojia et al. | 709/224 |
| 2003/0120822 A1 * | 6/2003 | Langrind et al. | 709/251 |
| 2003/0191823 A1 * | 10/2003 | Bansal et al. | 709/220 |
| 2004/0249919 A1 * | 12/2004 | Mattheis | 709/223 |

* cited by examiner

*Primary Examiner*—Kuen S Lu
(74) *Attorney, Agent, or Firm*—Oblon, Spivak, McClelland, Maier & Neustadt, L.L.P.

(57) ABSTRACT

A method of dynamically managing software functionality of a plurality of non-general purpose computing devices via a network including receiving a management request, storing an identification file and a modification package, accessing the identification file with a management agent in response to the reception of the management request, establishing communication between the management agent and a corresponding deployment agent of the selected ones of the plurality of non-general purpose computing devices via the interface and receiving a status designation from each of the selected ones of the plurality of non-general purpose computing devices via a corresponding deployment agent, delaying the transfer of the modification package with deployment agents currently indicating a status of processing a previously initiated management request and initiating transfer of the modification package with deployment agents currently indicating an available status.

14 Claims, 24 Drawing Sheets

```
1   iterate next request if previous request did
2     not fail
3     if first request
4         check to see if another user is running job
5     against this device
6         if true, set device as failed (ends req
7     sequence)
8         if false, place device address on list that
9     all users will check against
10        continue
11    if request is after reboot
12    wait 20 seconds
13    update device object with new request state
14    if request is first in sequence
15    wait 5 seconds
16    configure http communication (jakarta
17    HTTPClient API)
18    try request to agent
19    send request
20    if agent does not respond in 40 seconds
21        update device as failed (ends req sequence)
22    if http response code = 404
23        update device and retry (3 max, set device
24    as failed on 4)
25    if http response code = 200
26    parse RiDeploy response codes
27    if RiDeploy error
28    update device and retry (3 max, set device as
29    failed on 4)
30    else if validate step
31    validate result
32    parse xml
33    if other http response
34    update device and retry (3 max, set device as
35    failed on 4)
36    catch ConnectException
37    if after reboot step
```

*Fig.8A*

```
1   update device and retry (20 max, set device
2   as failed on 21)
3   else
4   update device and retry (3 max, set device as
5   failed on 4)
6   catch IOException
7   if after reboot step
8   update device and retry (20 max, set device
9   as failed on 21)
10  else
11  update device and retry (3 max, set device as
12  failed on 4)
13  catch Exception
14  if after reboot step
15  retry (20 max, set device as failed on 21)
16  else
17  retry (3 max, set device as failed on 4)
18      finally
19      close connection
20      update device
21  next request to iterate (top)
22  when request iteration ends
23     log
24     remove device address from list that all
25  users check against
26
27
```

*Fig. 8B*

| Device List | EScan | Get Info | Job Log | Log Out |
| 310 | 311 | 312 | 313 | 314 |

EmbeddedScan Result: 390

Install

Job Status: RUNNING —391

Click Update to refresh until the job is completed.

[Update] —392

| Device 393 | Status 394 | Communication Step (9) 395 | Attempts | Current Step 396 | Failure Description 397 |
|---|---|---|---|---|---|
| 172 18 17 200 | RUNNING | 7:Rebooting | 1 | | |
| 172 18 50 76 | RUNNING | 7:Rebooting | 1 | | |
| 172 18 50 84 | RUNNING | 7:Rebooting | 1 | | |
| 172 18 50 50 | RUNNING | 7:Rebooting | 1 | | |
| 172 18 50 56 | RUNNING | 6:Uploading File | 1 | | |
| ---- | | | | | |
| 172 18 50 45 | FAILED | 1:Contacting Agent | 1 | | Could not connect to host |
| 172 18 19 103 | RUNNING | 7:Rebooting | 1 | | |

*Fig. 16*

| Device List | EScan | Get Info | Job Log | Log Out |
| 310 | 311 | 312 | 313 | 314 |

400

EmbeddedScan Result:

Install
Job Status: COMPLETED —391
WARNING! 1 failure(s)

| Device | Status | Elapsed Time | Failed Communication Step | Failure Description |
|---|---|---|---|---|
| 172 18 17 200 | SUCCESS | 02:13 | | |
| 172 18 50 76 | SUCCESS | 02:20 | | |
| 172 18 50 84 | SUCCESS | 02:20 | | |
| 172 18 50 50 | SUCCESS | 02:29 | | |
| 172 18 50 56 | SUCCESS | 02:23 | | |
| ---- | FAILED | 00:06 | 1:Contacting Agent | Could not connect to host |
| 172 18 19 103 | SUCCESS | 02:19 | | |

| | 310 | 311 | 312 | 313 | 314 |
|---|---|---|---|---|---|
| | Device List | EScan | Get Info | Job Log | Log Out |

Get Info Result:

ProductID: 33818368 (xlet) —431
Job Status: COMPLETED —441
WARNING! 1 failure(s) —442

443              444    445

Elapsed  Failed Communication 434   435

| Device | Status | Elapsed Time | Step (?) | Result |
|---|---|---|---|---|
| 172 18 17 200 | SUCCESS | 00:02 | | pdid=33818368 version=1.00 path=hdd size=1278906 expirationdate=20151231 name=EmbeddedScan autorun=true |
| 172 18 50 76 | SUCCESS | 00:02 | | pdid=33818368 version=1.00 path=hdd size=1278906 expirationdate=20151231 name=EmbeddedScan autorun=true |
| 172 18 50 84 | SUCCESS | 00:02 | | pdid=33818368 version=1.00 path=hdd size=1278906 expirationdate=20151231 name=EmbeddedScan autorun=true |
| 172 18 50 50 | SUCCESS | 00:02 | | pdid=33818368 version=1.00 path=hdd size=1278906 expirationdate=20151231 name=EmbeddedScan autorun=true |
| 172 18 50 86 | SUCCESS | 00:02 | | pdid=33818368 version=1.00 path=hdd size=1278906 expirationdate=20151231 name=EmbeddedScan autorun=true |
| 172 18 50 45 | FAILED | 00:05 | 1.Contacting agent | Could not connect to host |
| 172 18 1 196 | SUCCESS | 00:02 | | pdid=33818368 version=1.00 path=hdd size=1278906 expirationdate=20151231 name=EmbeddedScan autorun=true |

| Job Log | | | | | | | | | 450 | |
|---|---|---|---|---|---|---|---|---|---|---|
| 451 | 452 | 453 | 454 | 455 | 456 | 457 | 458 | | | 459 |
| Job Start Time | User | Job | Device | Result | Dur'n | Job Settings | Failure Description | | | Post-Info |
| 05/11/2006 14:54:29 | 70794 | GET_INFO | 172 18 50 45 | FAIL | 00:05 | 33818368x | The host did not accept the connection within timeout of 5000ms | | | 1GetInfoServlet1 |
| 05/11/2006 14:54:29 | 70794 | GET_INFO | 172 18 17 200 | SUCCESS | 00:02 | 33818368x | | | | Installed |
| 05/11/2006 14:54:29 | 70794 | GET_INFO | 172 18 50 42 | SUCCESS | 00:02 | 33818368x | | | | Installed |
| 05/11/2006 14:54:21 | 70794 | INST_ESCAN | 172 18 50 86 | SUCCESS | 02:25 | EScan hdd | | | | |
| 05/11/2006 14:52:04 | 70794 | INST_ESCAN | 172 18 50 45 | FAIL | 00:08 | EScan hdd | The host did not accept the connection within timeout of 5000ms | | | 1GetInfoServlet1 |
| 05/10/2006 21:18:49 | 01435 | UN_ESCAN | 172 18 50 76 | SUCCESS | 01:56 | EScan | | | | |
| 05/10/2006 21:14:07 | 01435 | UPLOAD | | SUCCESS | | ~76>txt(1) | | | | |

Fig. 22

REMOTE DISTRIBUTION/INSTALLATION UTILITY AND ASSOCIATED METHOD OF DEPLOYING EXECUTABLE CODE

BACKGROUND OF THE INVENTION

The present invention relates to a remote distribution/installation utility and associated method of deploying executable code.

It should also be noted that the "background" description provided herein is for the purpose of generally presenting the context of the invention. Work of the presently named inventors, to the extent it is described in this background section, as well as aspects of the description which may not otherwise qualify as prior art at the time of filing, are neither expressly or impliedly admitted as prior art against the present invention.

In multi-function printing devices ("MFPs") software updates are employed to distribute new and/or revised vendor features to a device. In order to increase the efficiency of this process, systems were developed that allowed users to communicate directly to the MFPs and remotely provide a program to the MFP. However, when connecting to MFPs over a network, determination as to current versions, statuses and previous updates of the MFP are problematic.

Additionally, once a user had installed the program on the MFP it was difficult to determine if the program was correctly installed or if there was an error in the process.

SUMMARY OF THE INVENTIONS

The present inventions provide, inter alia, a server for dynamically managing software functionality of a plurality of non-general purpose computing devices via a network. The server includes an interface operably linked to the network for receiving a management request including an identification file of a client device designating selected ones of the plurality of non-general purpose computing devices. The management request also includes a modification package for distribution to the selected ones of the plurality of non-general purpose computing devices. The server further includes a memory configured to store the identification file and the modification package. A management agent is responsive to the management request to access the identification file and establish communication with a corresponding deployment agent of the selected ones of the plurality of non-general purpose computing devices via the interface to negotiate a network transfer of the modification package for installation thereto. The transfer is initiated with the selected ones of the deployment agents based upon a provided status indication. The transfer of the modification package is not initiated with deployment agents currently indicating a status of processing a previously initiated management request, and, transfer is initiated with deployment agents currently indicating an available status.

A distribution node dynamically manages software functionality of a plurality of non-general purpose computing devices via a network. The node includes a graphical user interface operably linked to the network for receiving a management request including an identification file of a client device designating selected ones of the plurality of non-general purpose computing devices. The management means includes a modification package for distribution to the selected ones of the plurality of non-general purpose computing devices and a memory configured to store the identification file and the modification package. The node further includes a management means for accessing the identification file and for establishing communication with a corresponding deployment agent of the selected ones of the plurality of non-general purpose computing devices. The management means operates in response to a management request, for negotiating and performing a network transfer of the modification package to the corresponding deployment agent. The transfer is initiated with the selected ones of the deployment agents based upon a provided status indication to install the modification package thereto. Transfer of the modification package is not initiated with deployment agents currently indicating a status of processing a previously initiated management request, and, transfer is initiated with deployment agents currently indicating an available status. A method of dynamically managing software functionality of a plurality of non-general purpose computing devices via a network is provided. The method includes receiving a management request including an identification file of a client device designating selected ones of the plurality of non-general purpose computing devices, and a modification package for distribution to the selected ones of the plurality of non-general purpose computing devices. The method also includes storing the identification file and the modification package and accessing the identification file with a management agent in response to the reception of the management request. Establishing communication between the management agent and a corresponding deployment agent of the selected ones of the plurality of non-general purpose computing devices via the interface as well as receiving a status designation from each of the selected ones of the plurality of non-general purpose computing devices via a corresponding deployment agent is also included in the method. Finally, delaying the transfer of the modification package with deployment agents currently indicating a status of processing a previously initiated management request and initiating transfer of the modification package with deployment agents currently indicating an available status are included in the method.

It is to be understood that both the foregoing general description of the invention and the following detailed description are exemplary, but are not restrictive, of the invention.

BRIEF DESCRIPTION OF SEVERAL VIEWS OF THE DRAWINGS

Other objects, features and advantages of the present invention will become more apparent from the following detailed description when read in conjunction with the accompanying drawings, in which:

FIGS. 8A and 8B show an example of looping pseudo-code logic employed by the agent included in each MFP;

FIG. 16 is an exemplary web-based client interface in which the embedded scan installation job status is displayed;

FIG. 17 is an exemplary web-based client interface in which the embedded scan installation job result is displayed;

FIG. 21 is an exemplary web-based client interface in which the get information result window is displayed;

FIG. 22 is an exemplary web-based client interface in which the job log window is displayed;

DETAILED DESCRIPTION OF THE INVENTIONS

The present advancements relate, in part, to a server for dynamically managing software functionality of a plurality of non-general purpose computing devices via a network, the network being a communications network. The communications network is typically a WAN, such as the Internet. However any type of network, including a LAN or ad-hoc may be utilized, and may use a physical network medium such as wired, wireless, optical, or any other suitable medium.

The server includes an interface operably linked to the network for receiving a management request including an identification file of a client device designating selected ones of the plurality of non-general purpose computing devices. The management request also includes a modification package for distribution to the selected ones of the plurality of non-general purpose computing devices.

The server further includes a memory configured to store the identification file and the modification package. The memory includes any suitable volatile, non-volatile, dynamic memory or flash memory card such as MMC, USB Keydrive, SmartMedia, CompactFlash I and II, Secure Digital, SONY™ Memory stick or any suitable solid state disk.

A management agent is responsive to the management request to access the identification file and establish communication with a corresponding deployment agent of the selected ones of the plurality of non-general purpose computing devices via the interface to negotiate a network transfer of the modification package for installation thereto. The transfer is initiated with the selected ones of the deployment agents based upon a provided status indication. The transfer of the modification package is not initiated with deployment agents currently indicating a status of processing a previously initiated management request, and, transfer is initiated with deployment agents currently indicating an available status.

Figure 1:
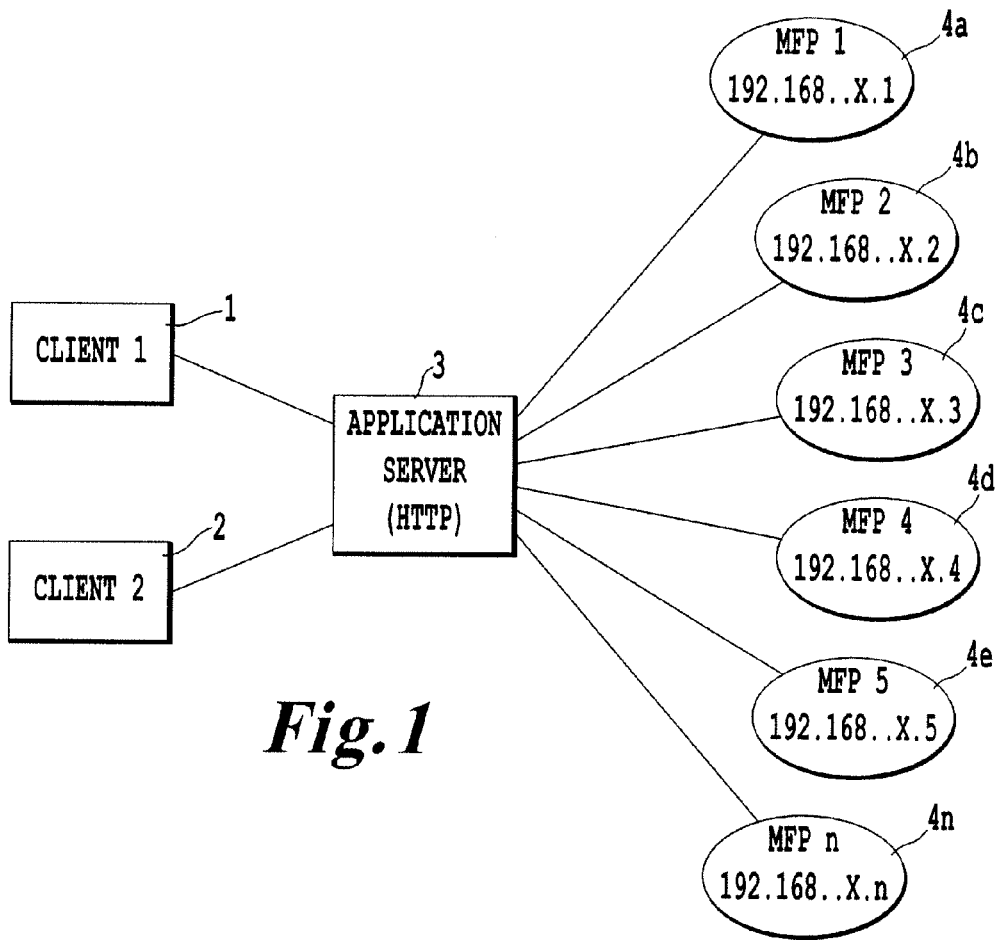
FIG. 1 is a block diagram showing an overview of the relationship between clients, an application server, and individual MFPs according to an exemplary embodiment of the present invention.

Referring now to the drawings, wherein like reference numerals designate identical or corresponding parts throughout the several views and more particularly to FIG. 1 thereof, there is illustrated an exemplary remote distribution/installation utility and associated method of deploying executable code. As show in FIG. 1, a first client 1, a second client 2, an application server 3 and several Multi-Function Printers ("MFPs") 4a . . . n. Each client (1,2) connects to the application server 3 via a communications network and the application server 3 connects to each MFP 4a . . . n via communications network. As noted above, the communications network could be a local LAN, a WAN, the Internet or any desired type communications network. Further, the communication medium may use a physical network medium such as wired, wireless, optical, or any other suitable medium.

The client (1,2) may correspond to a PC or any other type of device which includes a client interface enabling a user to interface with a server via a communications network. The application server 3 is preferably a web server accessed via http, however the application server 3 could be any server device or software that enables clients to interface the hardware of the application server 3.

Each MFP 4a . . . n corresponds to a multifunction printer which includes a unique identifier such as an IP address or a host name, for example, as shown in FIG. 1, MFP 1 4a has IP address 192.168.x.1, however a host name such as MFP1 could be used. The MFP is any printer or copier which includes multiple functions such as scanning, printing and/or faxing. Additionally, the MFP described above may include a copier that scans and prints a document in a single step as scanning and printing are distinct functions. In addition the MFP could be any non-general purpose computing device.

Figure 2:
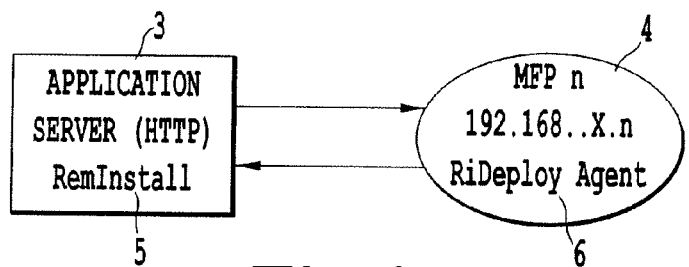
FIG. 2 is a block diagram of the interaction between the application server and the MFP according to one embodiment of the present invention.

FIG. 2 shows the relationship between the application server 3 and each MFP 4a . . . n. The application server 3 includes a web server installed in correspondence with a program entitled RemInstall 5. The RemInstall 5 program communicates with a program entitled RiDeploy agent 6 installed on each MFP 4a . . . n.

As noted above the application server 3 includes a web server which is, in the exemplary embodiment, an Apache Tomcat server.

The Tomcat server being an open source web server platform which implements the servlet and JavaServer Page ("JSP") specifications of Sun Microsystems. The Tomcat server provides an environment enabling Java code to run in cooperation with a web server. However other types of JSP capable web-servers or java servers are available such as Blazix from Desiderata Software, WebLogic from BEA Systems, or WebSphere from IBM as known to those skilled in the art. Moreover, those skilled in the art will recognize that the advancements described herein are not limited to JSP or Java servers, but any suitable programming language or software or firmware may be utilized.

The RemInstall 5 program is a servlet developed to communicate with the Rideploy agent 6. The Rideploy agent 6 is an example of a deployment agent. The RemInstall 5 application is a servlet-JSP application residing on the application server 3. The RemInstall 5 application is an example of a management agent. JSP is a Java technology enabling generation of dynamic documents in response to a Web browser request. JSP allows Java code and certain pre-defined actions to be embedded into a static webpage.

Users of the clients interact with the RemInstall 5 program using a web browser. Users send job requests to the web server which accesses the RemInstall 5 program. As a result, the RemInstall 5 program pushes a job based on the user input to multiple MFPs 4a . . . n concurrently, where the job corresponds to installing a modification package on the MFPs 4a . . . n. The modification package could be objects, configuration files, executable code, un-installation sequences, virtual machine updates, text files, xlets, applets, servers, software, applications or the like.

On each of these MFPs 4a . . . n resides the RiDeploy agent 6, the RiDeploy agent 6 being a java servlet application. The Rediploy agent 6 responds to requests-pushed by the RemInstall 5 program. The requests sent by the RemInstall 5 program to the RiDeploy agent 6 are sent using http commands. When responding, the RiDeploy agent 6 sends its own response code in the body of each http request response. Depending on the type request received, xml information from the MFP may also sent from the RiDeploy agent 6. Thus the RemInstall 5 program is installed on the application server 3 and interacts with the MFP 4a . . . n via the RiDeploy agent 6.

Figure 3:
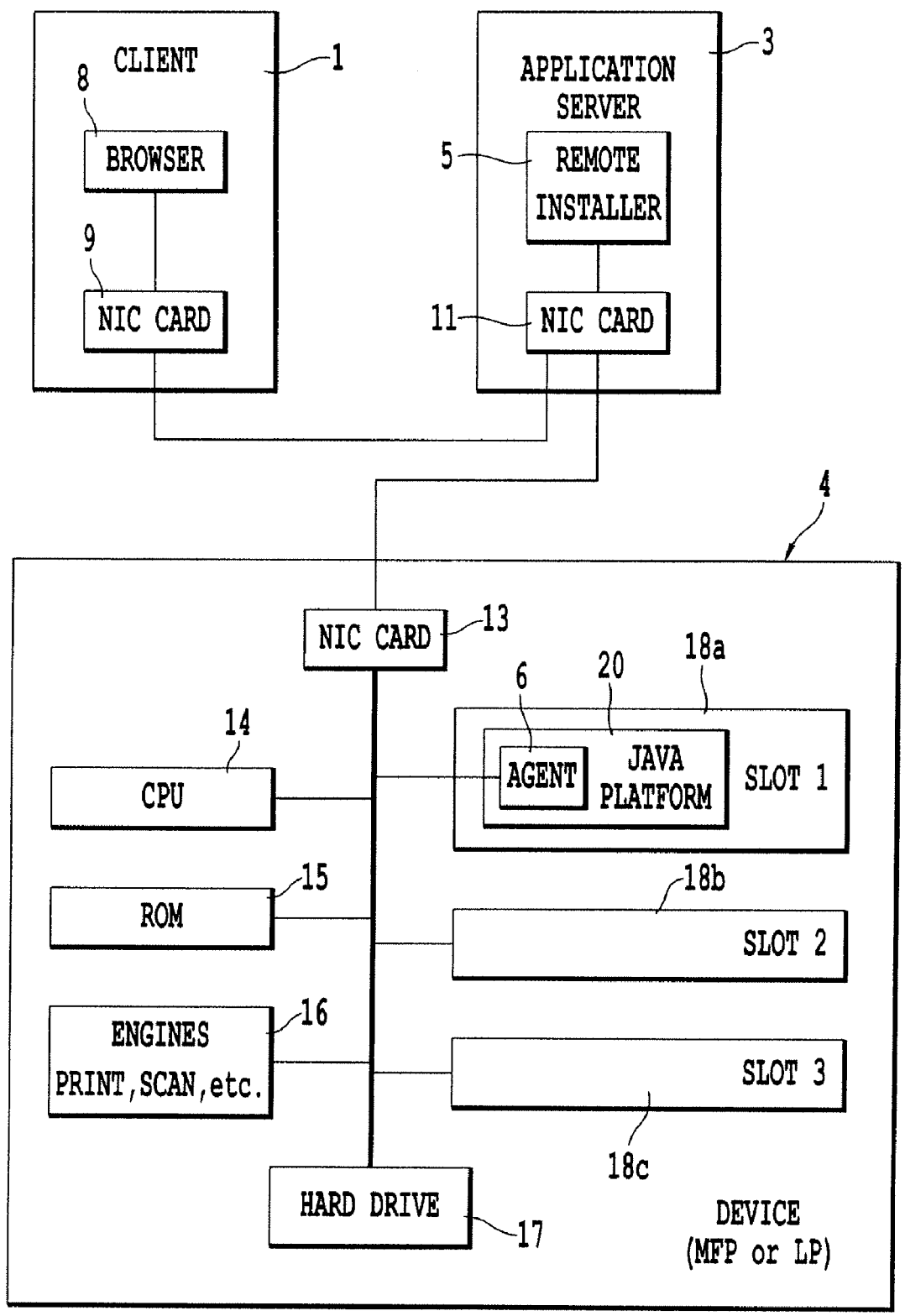
FIG. 3 is a block diagram of a more detailed view of the interaction between the application server and the MFP according to one embodiment of the present invention.

FIG. 3 shows a more detailed illustration of the client 1, the application server 3 and the MFP 4. The client 1, includes a web-browser 8 and a Network Interface Card ("NIC") 9 for communicating with the application server 3. The application server 3 includes the RemInstall program 5 and a NIC 11 which allows the application server 3 to communicate with the client 1 and the MFPs 4a . . . n. The MFP 4 also includes a NIC card 13 enabling communication via a communication network. Also included in the MFP 4 are a CPU 14, ROM 15, a scan/print engine 16, a hard drive 17 as well as several Secure Digital ("SD") slots 18a . . . c. Secure Digital is flash memory format used in portable devices and MFPs. Included in one of the SD slots, in this example 18a, is an SD card 20 which includes a java platform/CVM. CVM is a Java Virtual Machine that is distributed as part of the Connected Device Configuration (CDC). CDC is a Java 2 Platform, Micro Edition (J2ME) configuration that provides core class libraries to non-computer devices.

On the CVM virtual machine is installed the RiDeploy agent 6. Further description of the hardware of a typical MFP 4 can be found below with reference to FIG. 24. The CVM virtual machine and the RiDeploy agent 6 are initially installed by a service technician inserting the SD card 20 into the MFP 4. Once this installation has been accomplished, the CVM virtual machine can be updated by the remote installation procedure. As noted above, the CVM virtual machine is a java virtual machine specifically designed for use in non general purpose computer devices. The CVM virtual machine enables java xlet/server applications to interface with the MFP 4 hardware via the operating system of the MFP. A java server application enables a user to directly connect to the device which has the java server application installed. A java xlet application is an application model included in the Connected Device Configuration (CDC). Xlets are similar to applets, but offer methods for starting up and shutting down the xlet.

Figure 4:
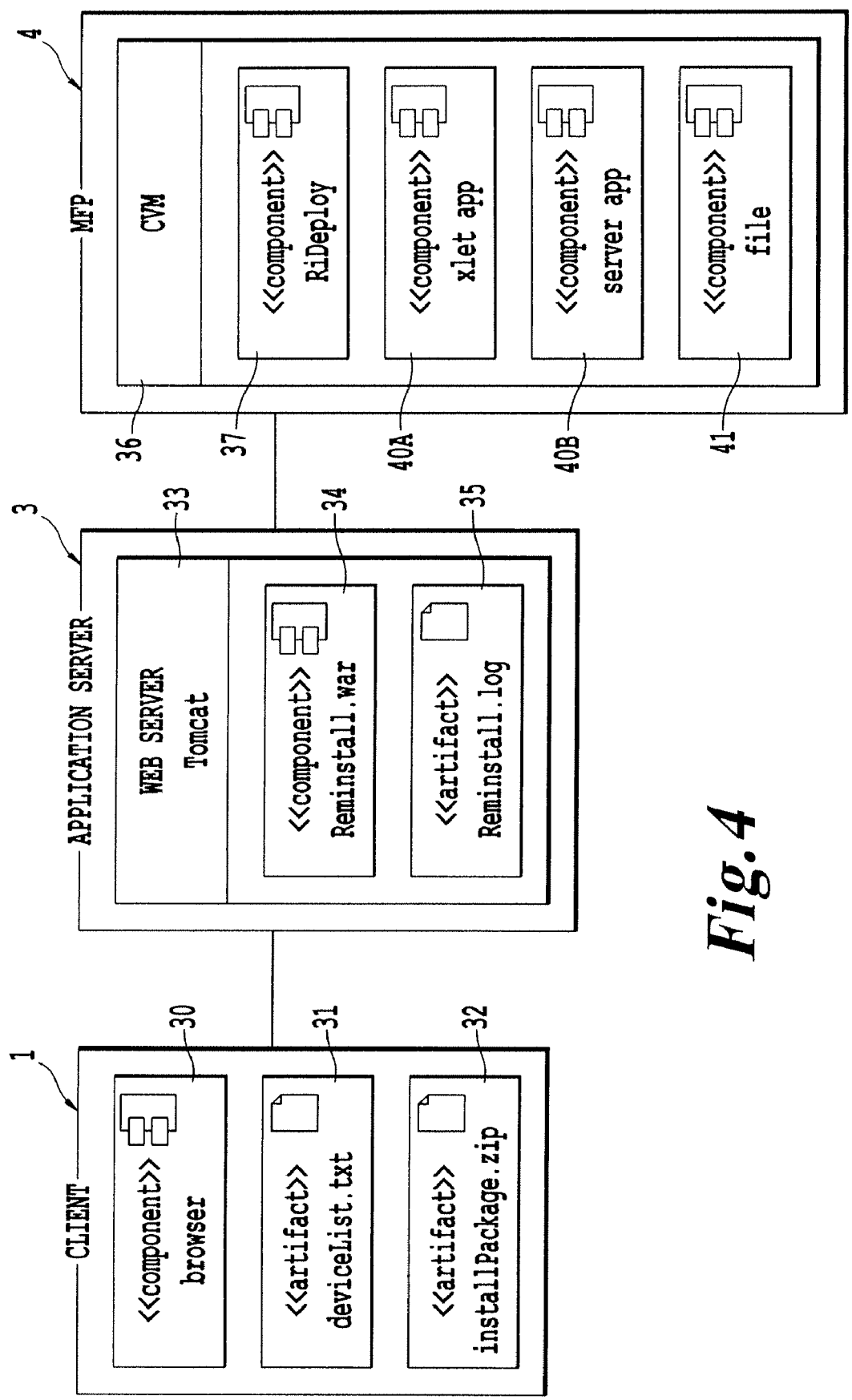
FIG. 4 is a block diagram showing an overview of the relationship between each client, the application server, and each individual MFP according to an embodiment of the present invention.

FIG. 4 is a more specific example of internal software components of the client 1, application server 3 and MFP 4. In the client 1, there includes a web browser component 30 as well as the device list artifact 31 and the installpacket.zip artifact 32. The web browser component 30 can be any web browsing program that can access the internet via http, for example, Internet Explorer, Firefox, Opera or Mozilla. The devicelist.txt artifact 31 is a text file with a list of IP addresses or host names of MFPs 4a . . . n which the user desires to access. The device list could also be called an identification file. This list is uploaded to the RemInstall 5 program and determines which MFPs 4a . . . n the RemInstall program accesses. The installpackage.zip artifact 32 is a compressed version of the application, CVM virtual machine upgrade or file that will be transferred to the RemInstall 5 program and then pushed to the MFP 4 devices defined in the device list found in devicelist.txt 31.

FIG. 4 further illustrates that the application server 3 includes a JSP enabled web server. In a preferred embodiment of the present invention, the web server is an Apache Tomcat server 33 as discussed above. Also included in the application server 3, is the RemInstall.war component 34. The RemInstall.war file is an archive file including the elements of the RemInstall program used to operate on the application server 3. Also included on application server 3 is the RemInstall.log file which is a log file created by the RemInstall program.

On MFP 4 there is included a java platform, the CVM virtual machine 36. Installed with and utilizing the CVM virtual machine 36 is the RiDeploy agent 37. As discussed above, the RiDeploy agent 37 is a java servlet application that is bundled with the CVM virtual machine 36 and responds to http requests sent by the RemInstall application 6 found on the application server 3. Also available to be installed on the MFP 4 are an xlet/server application 40A&B or a file 41. All these components 40A&B and 41 can be installed in multiple sets, in other words, several xlet/server applications 40A&B are able to be installed.

Thus, FIG. 4 shows a user using a Client 1 can use a web browser 30 to upload a device list 31 and an install package 32 to the application server 3. The application server 3 then, via the RemInstall program 34, can communicate with the RiDeploy agent 37 to install the components found in the install package 32 to each MFP 4a . . . n found in the device list 31. Thus components 40A&B and 41, shown on MFP 4 in FIG. 4, can be installed on multiple MFPs 4a . . . n from a single client 1 simultaneously.

Figure 5:
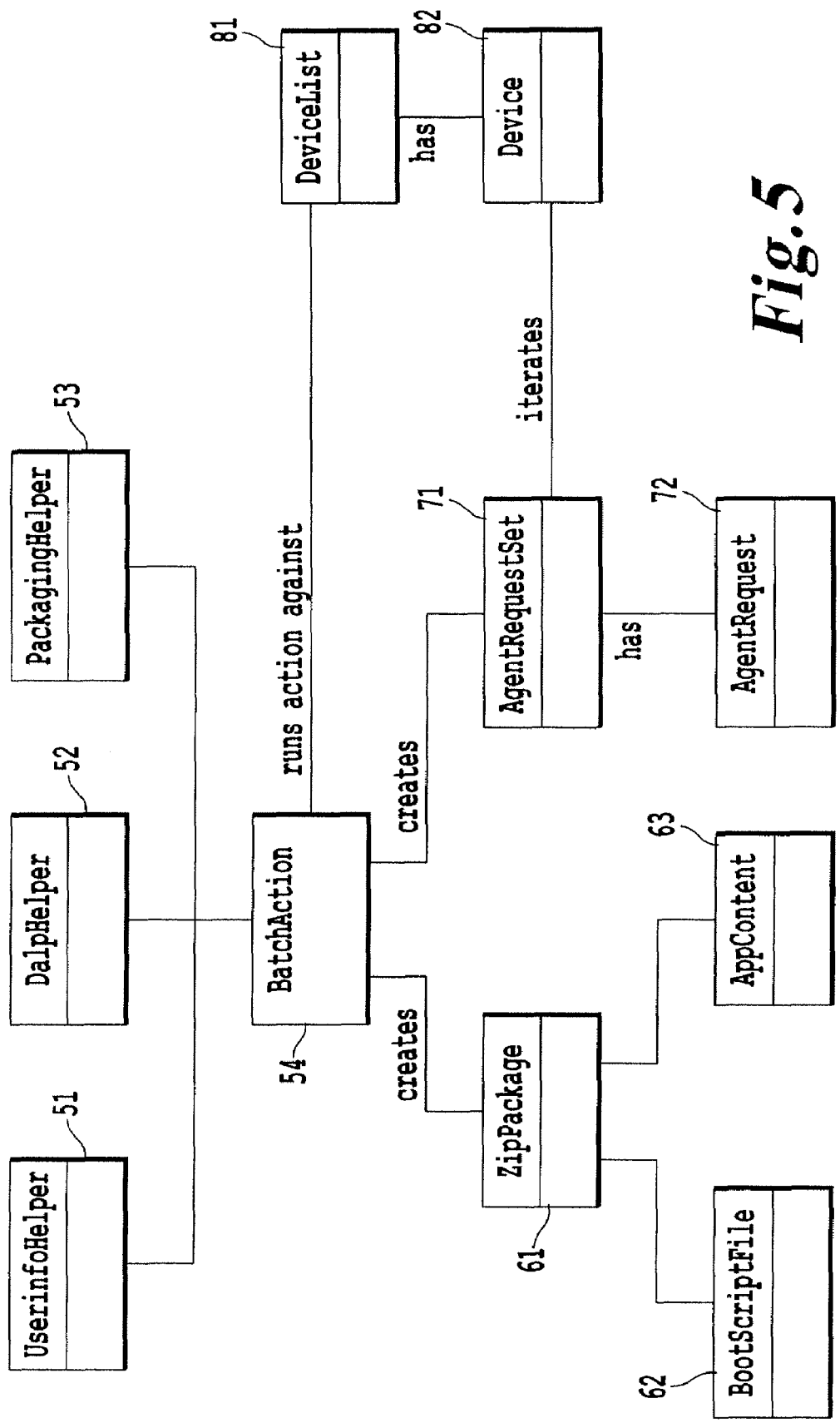
FIG. 5 is a domain model illustrating how a RemInstall program installed on the application server prepares for a sequence of communications to an agent installed on the MFP.

FIG. 5 shows a BatchAction process 54 of the RemInstall program installed on the application server 3. The BatchAction process 54 is started by fetching information from a user info helper 51, a Dalp helper 52 and the packaging helper 53. The user info helper 51 gathers information received through the http request made by the client 1 to the application server 3. The Dalp helper 52 gathers information found in the Dalp file uploaded to the application server 3 in the installpackage.zip file 32. The Dalp file is a configuration file including settings for the RemInstall program 5. The packaging helper 53 gathers information from the uploaded program package.

The BatchAction process 54 then creates a zip package 61 which includes a boot script file 62 and application contents 63. The BatchAction process 54 creates the boot script file 62 dynamically from the information retrieved from the user info helper 51, the dalp helper 52 and the packaging helper 53. The boot script file 62 is then packaged with application contents 63 into one zip package 61. The application contents 63 are the user uploaded java xlet/server app or file that the user desires to install on the MFP 4a . . . n.

The BatchAction process 54 then creates, in an agent request set 71, a sequence of requests to send to the RiDeploy agent. Several specific agent requests 72 are included in the agent request set 71.

Next, the BatchAction process 54 executes the request sequence found in the agent request set 71 against the device list 81, spawning a new thread for each MFPs 4a . . . n found in the list.

Each MFP 4a . . . n found on the device list 81 interfaces, via a RiDeploy agent, with the RemInstall program. Each request in the Agent request set is sent to the RiDeploy agent inciting a response. Thus the system iterates through each request with the each device 82 (MFP 4a . . . n) on the device list 81.

Thus, the BatchAction process 54 of the RemInstall program 5 unzips the received package, reads the contents to build a boot script instruction and recompresses the package including the boot script file in the recompressed file.

In a preferred embodiment of the present invention the boot script content may or may not be needed depending on the use of the RemInstall program 5. For example, the get info command may not utilize a boot script while, in contrast, the install or uninstall xlet/server, upgrading or downgrading platform, and pushing a file to the MFP may use a boot script.

When repackaging the received content the RemInstall program 5 creates a temporary folder for each client session. The temporary folder's name is identical to the client session ID. All uploads from the client are stored and all repackaging by the RemInstall program 6 occurs, in this directory. Each new upload clears the contents existing in this temporary folder and when any client logs in each temporary folder which is older than 24 hours is deleted. Multiple clients may interface with the RemInstall program 5 concurrently.

Similar to the boot scripts discussed above, the sequence of requests sent to the RiDeploy agent 6 by the BatchAction process 54 of the RemInstall program 5 differ according to the type of use of the system.

For example, in the get device info use case, the request sequence only includes two commands. In the get device info use the first is the get info servlet command and the second is the end servlet (restart=false) command. The get info servlet command retrieves information from the MFP in the xml format and sets the Panel Lock message on the MFP 4a . . . n. The end servlet (restart=false) command turns the panel lock off on the MFP 4a . . . n.

In the install server application use case, the get info servlet is the first command, this command retrieves information in xml for preprocessing, if needed, and locks the panel of the MFP 4a . . . n. The next command, install servlet, installs the user uploaded upload package to the MFP 4a . . . n. The get info servlet request is then communicated which retrieves xml information from the MFP 4a . . . n to verify success of the install. Finally, the end servlet (restart=false) command is communicated, as noted above, this command turns the panel lock off on the MFP 4a . . . n.

In the uninstall server application use case the first request, get info servlet, retrieves xml info for preprocessing if needed, and also locks the panel. The next request is the uninstall servlet request and this request uninstalls the server application. The get info servlet is then used to retrieve xml info and verify the uninstall. Finally, the end servlet request (restart=false) is used to turn the panel lock off.

In the case of installing an xlet application the first request in the request sequence is the get info servlet request. The get info servlet turns the panel lock on and retrieves xml information for preprocessing if needed. The next request is the file upload servlet request which uploads a file including the xlet application and a boot script. The next command is the end servlet request (restart=true) which issues reboot command. The get info servlet command is next and retrieves xml info to verify the installation. Finally the end servlet request (restart=false) is used to turn the panel lock off. It should be noted that when the end servlet request is received and restart is true this will reboot the MFP, while if the end servlet command is received where restart is false the command will merely unlock the operation panel.

The request sequence for the uninstall xlet application use case is the same as the request sequence for the install xlet application except that the file upload servlet command includes only a boot script command and not a file to be uploaded.

The upgrade CVM Virtual Machine use case includes the same request sequence as the install xlet application.

Finally the push file to device use case is the has the same request sequence as the install xlet application if reboot is required. If no reboot is required, then the get info servlet is used to turn the panel lock on. The file upload servlet is used to upload the file with a boot script and the end servlet request (restart=false) is used to turn the panel lock off.

Figure 6:
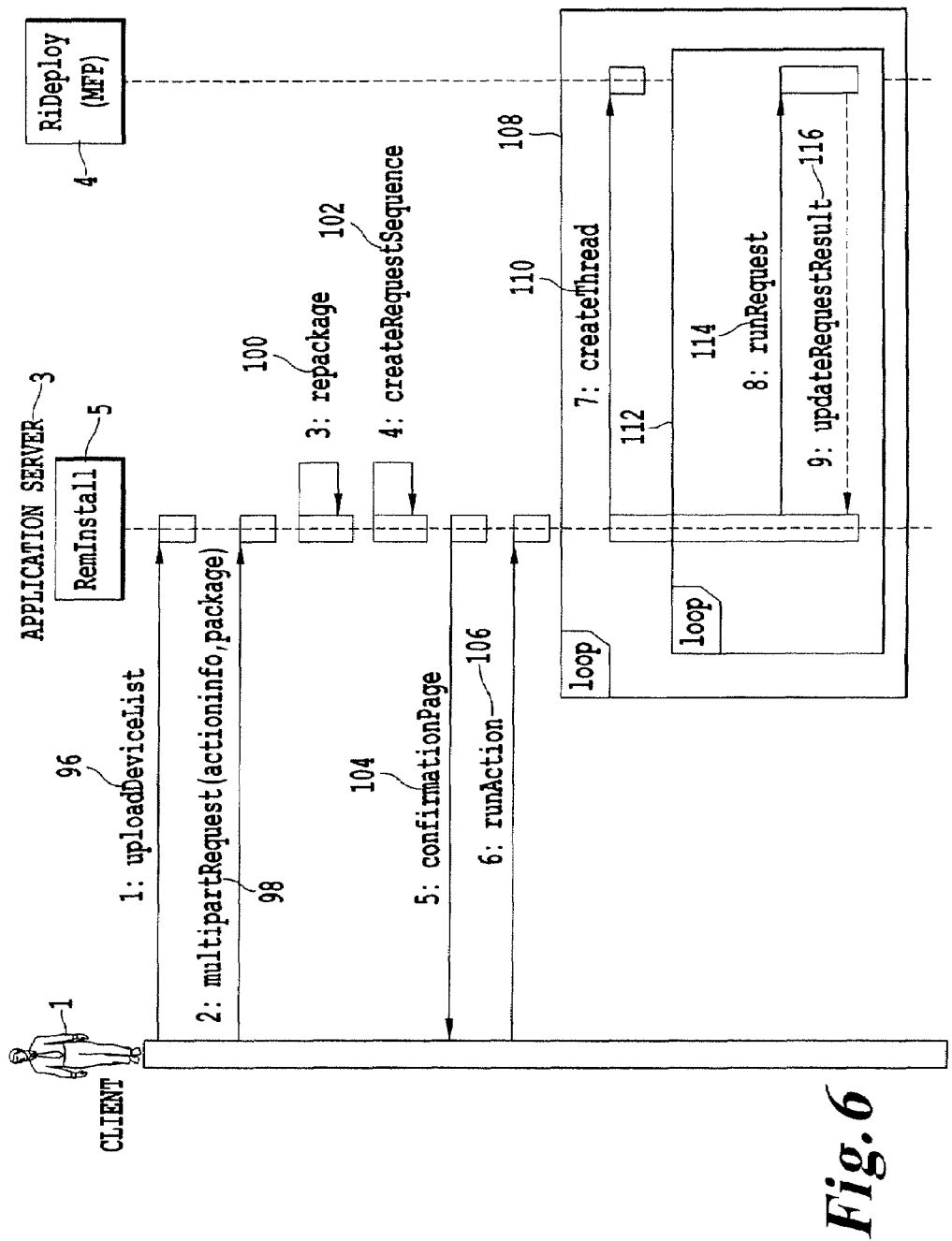
FIG. 6 is a diagram showing a general sequence for executing a remote job.

FIG. 6 is an example of a general sequence diagram of the remote install system. Beginning with the client 1, the client 1 uploads a device list 96 to the application server 3. The RemInstall program 5 receives the device list and stores the list on the application server 3. The client 1 then sends a request for a desired action in html form as well as a package, if required by the use that the client is requesting, in 98.

If the client 1 uploaded a file in step 98 to the application server 3, in step 100 the RemInstall program 5 decompresses the uploaded file, writes boot script instructions in a boot script file and recompresses the uploaded file and the boot script file in a single archive. In step 102 the RemInstall program 5 then creates a sequence of requests that will be sent to the RiDeploy agent 6. The sequence is built dynamically depending on the user of the client's browser input.

In step 104 the user of the client 1 is then presented with a conformation page displayed in the user of the client's web browser. In step 106 the user confirms the job and the job begins. In step 110 the RemInstall program 5 creates a thread for each MFP 4 found in the device list uploaded in step 96. For each MFP 4 in the device thread the RemInstall program 5 in step 114 loops through each request in the request response sequence with the RiDeploy agent 6.

In step 116, the RemInstall program 5 receives in each response from the RiDeploy agent 6, information regarding the status of the MFP 4. Any request resulting in an error response halts the job for that MFP 4. The batch job, or all concurrent threads, halts when each MFP 4 thread reports either success or failure. Although not shown in FIG. 6, at any point while the batch job is still running, the client 1 can, using the browser, request from the application server 3 an update on the status of the batch job. The RemInstall program 5 responds to the status request from the client 1 by querying the information received during the latest result update from each MFP.

It should be noted that multiple clients (1,2) are able to perform steps 96-106 simultaneously. However, in a preferred embodiment of the present invention, the RemInstall program 5 ensures that while one client 1 is performing a job on a MFP 4(the first request response was started by the last has not completed) in steps 108-116, no other client can run a job against the same MFP 4. The result is that the second client 2 is blocked from running a job against the MFP 4 until the job of the prior client 1 on that MFP 4 id completed (the request response communication steps have terminated because of success or failure of the job). The second client 2 is notified with a failure message indicating this block immediately after attempting to run a job on a blocked MFP 4.

This block is accomplished because the RemInstall program 5 holds a list of all devices with jobs currently running, called the blocked job list. When the first client 1 beings a job on MFPs 4a . . . n, MFPs 4a . . . n are checked against the blocked job list. If the MFP is not on the list, the MFP is added to the list and the job on that MFP proceeds. If the MFP is on the list a blocked message is relayed as a failure. When the first client's job is completed on MFPs 4a . . . n the MFPs 4a . . . n are removed from the blocked job list. Now when the second client 2 re-attempts the jobs there is no problem and the job proceeds. If both clients request the job at around the same time, the client who requests the job first is given priority and the second client is blocked.

Figure 7A:
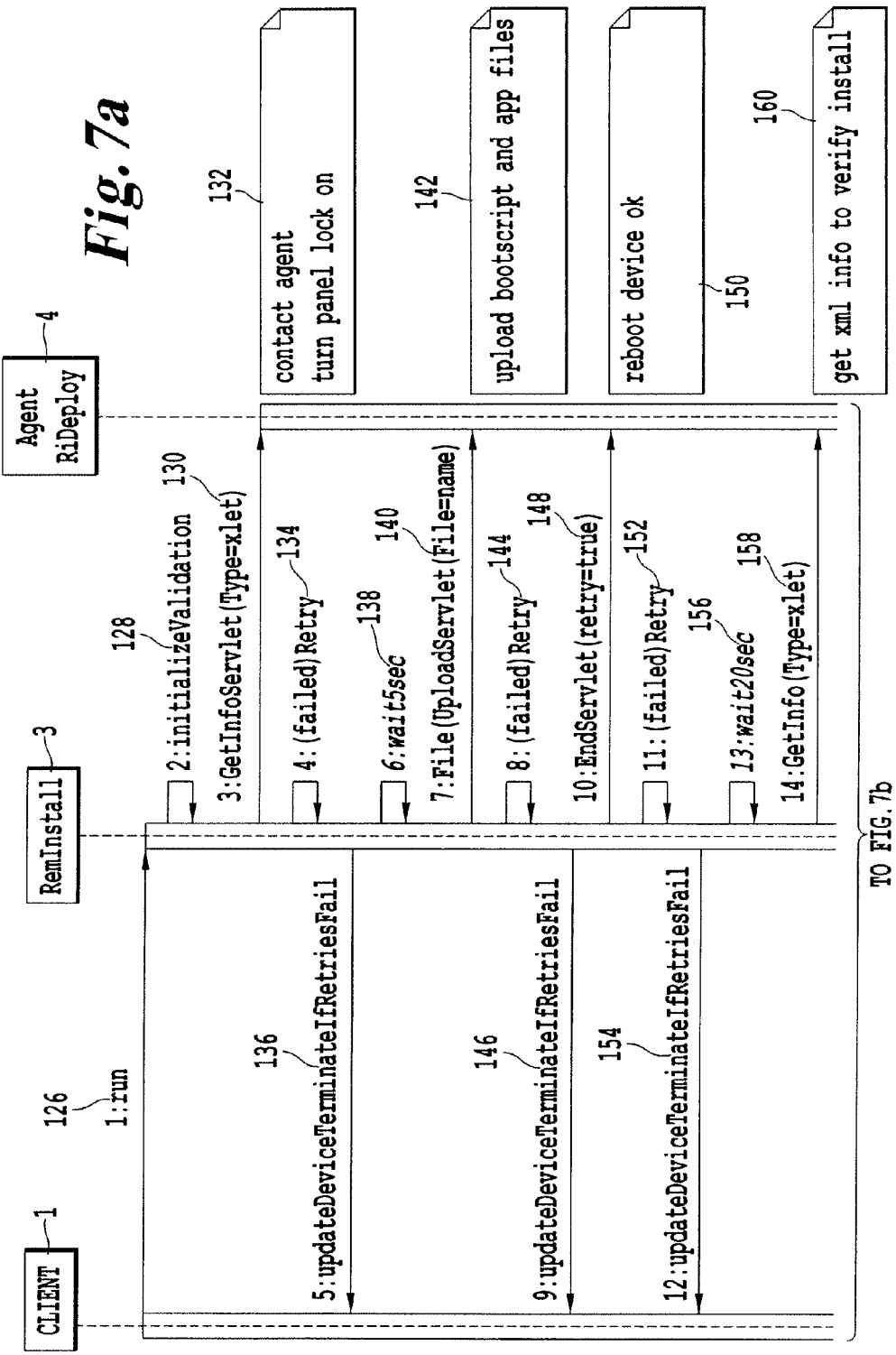
FIGS. 7A and 7B are a sequence diagram illustrating the commands sent from the application server to the agent included on each MFP.
Figure 7B:
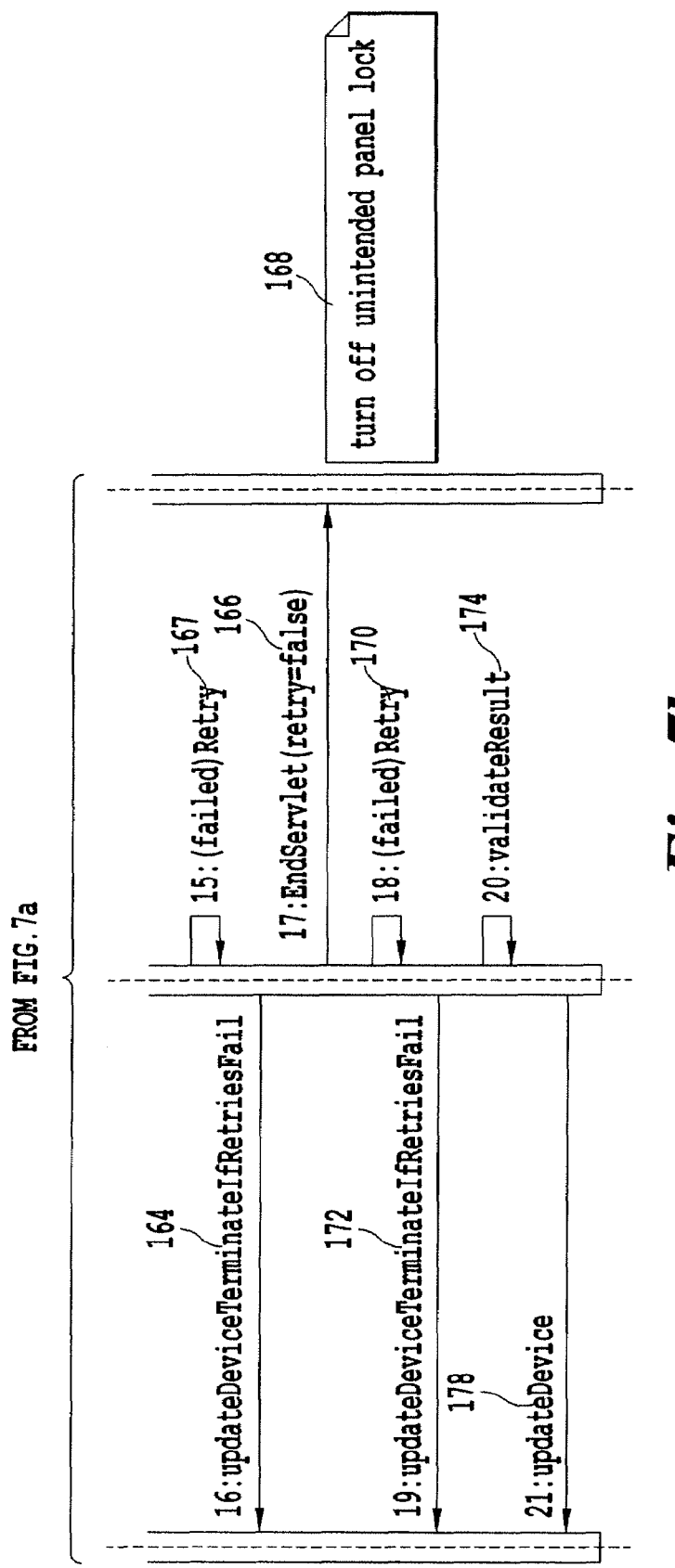

FIGS. 7A and 7B show the sequence diagram illustrating details of the request sequence communicated to the RiDeploy agent 6 by the RemInstall program 5 during the install xlet use case. This sequence diagram shows important steps realized during this communication but is not a complete description.

Beginning in FIG. 7A, the install xlet use case begins when the client runs a job. For example, in step 106 of FIG. 6, after the client 1 has received the confirmation from the application server 3, the client 1 begins the job. Once the client 1 executed the run command in step 126 and the command is received by the application server 3, validation is initialized in step 128. The validation is based on the use case in question and the user input. Further the validation is used to test if the completed job is successful. Once the validation has been initialized in step 128, in step 130, the get info servlet request sequence is sent by the RemInstall program 5 found on the application server 3 to the RiDeploy agent 6 found on the MFP 4.

The RiDeploy agent 6 on the MFP 4 then turns the panel lock on in step 132. The panel lock turns off the MFP 4 user interface panel to ensure that the MFP 4 cannot be used during the remote install process. If the RemInstall program 5 on the application server 3 is unable to connect with the MFP 4, the RemInstall program 5 retries to re-connect a number of times. Connection retry is done three times, waiting ten seconds between each retry.

In step 136, the result of the request is communicated back to the client by the RemInstall program 5 whether it is success, failure or retrying. The RemInstall program 5 on the application server 3 then waits five seconds in step 138. In step 140, the RemInstall program 5 communicates the file upload servlet command to the MFP 4 and the RiDeploy agent 6. This step 140 uploads the boot script and application files to MFP 4. As with the get info servlet described above with respect to step 130, in step 144 the RemInstall program 5 will retry up to three times, with ten seconds in between each retry, to connect to the MFP 4 if the communication of the file upload servlet fails in step 140.

In step 146, the client is updated as to the status of the command by the RemInstall program 5. In step 148, the RemInstall program 5 communicates the end servlet request (restart=true) sequence to the RiDeploy agent 6. This command causes the RiDeploy agent 6 to reboot the MFP 4 in step 150. If the communication of the end servlet (restart=true) request sequence fails in step 152, the RemInstall program 5 attempts a retry. The client 1 is then updated, in step 154, with the status of the communication.

In step 156, the RemInstall program 5 waits twenty seconds before communicating the next request. In step 158, the RemInstall program 5 communicates the get info request to the RiDeploy agent 6. This request causes the RiDeploy agent 6 to get xml information and send it back to the RemInstall program 5, thus verifying the installation. Beginning now in FIG. 7B, if the connection fails in step 167, a retry is accomplished. In step 164, the client 1 is updated with the status of the communication attempted in step 158. In step 166, the end servlet (restart=false) request is communicated turning off the panel lock 168. If the communication fails in step 166, a retry is accomplished in step 170 and in step 172 the client is updated with the status of the communication. In step 174 the results of the installation is validated and in step 178 the validation result is communicated to the client.

It should be noted that the different wait times exist for different steps, for example, returning to FIG. 7A, in step 138 the system waits for five seconds. This wait occurs after the first request in the request sequence and is used to prevent communication errors with the RiDeploy agent 6 when the first request causes the MFP 4 to wake up from the sleeping mode.

In step 156, the RemInstall program 5 waits twenty seconds. This wait occurs after the RiDeploy agent 6 has issued a reboot request to the MFP and is used to prevent communication errors with the RiDeploy agent 6 while the MFP 4 is rebooting.

Additionally in FIG. 7B in step 167, the retry is accomplished more than the default three times. The maximum retry attempts in this step are fifteen, waiting ten seconds between each retry. The fifteen possible retries are allowed in this step because the MFP 4 is rebooting and retries are expected to fail until the rebooting and platform set up are complete as different devices reboot and start up at different rates.

FIGS. 8a and 8b show an example of the looping pseudo code logic used by the RemInstall program 5 for communicating with the RiDeploy agent 6. Lines 1 and 2 start with the iterate next request if previous request did not fail step.

In line 3, checks if the next request to be communicated is a first request, if so, the RemInstall program 5 checks to see if another client is running a job against the MFP 4 to which the RemInstall program 5 is about to communicate. If a true result is returned then another client is running a job against the MFP 4 and the MFP communication is set as failed and the sequence ends. If the check finds that no other client is running a job against the MFP 4, in line 8, the MFP 4 address is placed on a list that all clients will check against before communicating a request.

In line 10 the loop continues. In line 11, the RemInstall program 5 checks to see if the request is after a reboot. If so, the RemInstall program 5 waits twenty seconds and updates the device object with a new request state. The device object holds a request state such as first request, after reboot, first in sequence or failed.

If the request state is first in the sequence in line 14, the system waits five seconds. After waiting five seconds, in line 16, the http communication is configured and line 18 begins the try request to agent function. In line 19, a request is sent. In line 20, of the agent does not respond within forty seconds, the state of MFP is updated as failed. If an http response code returned equaling 404, the state of the MFP is updated and a retry is attempted. Three retries are tried and the device is set as failed on the fourth retry.

If the http response code is returned and equals 200, then the RiDeploy response codes also included in the http response are parsed. If a RiDeploy error is found in the response codes, the client is notified and the state of the device is updated and a retry is attempted. After three retries, the device is set as failed on the fourth.

In line 30, if the MFP response is validated, the returned result is validated and xml received with the response is parsed. If a different http response is received, the MFP state is updated and retry is attempted. Three retries are attempted and the MFP 4 is set as failed on the fourth.

In line 36, if there is a connection exception, the reboot status is checked. In line 37 of FIG. 8A to line 2 of FIG. 8B, the system checks if the MFP state is after a reboot. If so, in line 1 of FIG. 8b the device status is updated and the retry is attempted. In this example, a retry is attempted twenty times with the device being set as failed on retry twenty-one. If a connection exception is caught and the state of the MFP is not after a reboot, then the device is updated and retry is attempted three times with device set as failed on the fourth retry attempt.

If there is an IO exception detected in line 6, the system checks if the MFP state is after reboot, if so, then the state is updated and a retry with twenty maximum re-attempts is run. If the MFP state is not after a reboot, then the device state is updated and a retry with three maximum retries is attempted.

If it is merely just an exception that is returned, similarly to the above connection exception and IO exception cases, if the MFP state is after reboot then there is a retry, with a twenty retry maximum. If the MFP state is not after a reboot then the retry has a three retry maximum.

Finally the connection is closed in line 19 and the state of the device is updated and the next request is iterated back at the top, beginning with line 1 of FIG. 8A. When the request iteration ends and no more requests are attempted, the log is updated at line 23 and the device address is removed from the list that all clients check against in lines 24 and 25.

Three different use cases will now be described with reference to FIGS. 9-23. The first use case is installing an embedded scan application. The second use case is determining which devices have the embedded scan application installed and the third use case is viewing a job log for a detailed description of job failures or history of past jobs.

The embedded scan application is a serverless scanning application that consists of xlet/server components. The xlet/server components correspond to the firmware of the embedded scan application and the server component that allow browser based remote configuration of the embedded scan application that is installed on the MFP 4. By using the remote installer, the client can configure the embedded scan application and push the xlet/server and configuration components to concurrent MFPs in one install action. Regarding the server component of the embedded scan application, this component will now reside on each MFP to allow the user to reconfigure the embedded scan application on single MFPs or check the configurations on single MFPs without using the remote installer.

From the perspective of the user of the remote installer, installing the embedded scan application is identical to installing a single xlet/server application on an MFP because the remote installer installs both embedded scan components as a single unit. The embedded scan component using the remote installer is customized as its own module in order to accomplish in a single action the configuration and the installation of the xlet/server. Similarly the uninstall of the server and xlet is accomplished as a single action. Note that the embedded scan application may serve as a general model to write other customized components-using the remote install system.

Figure 9:
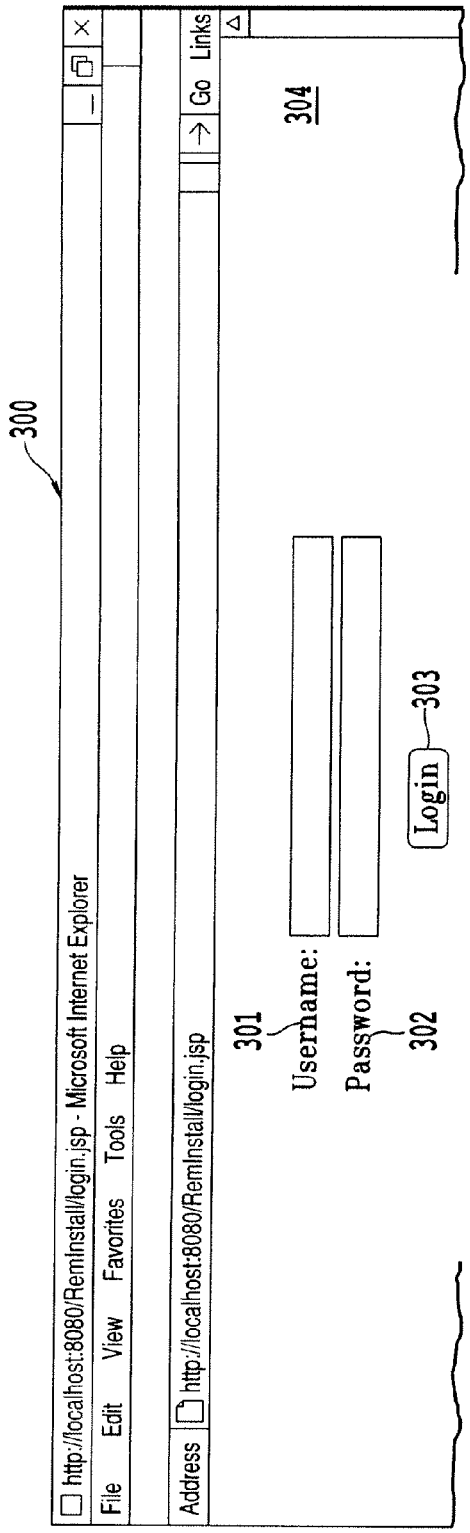
FIG. 9 is an exemplary web-based client interface in which the login window is displayed.

Turning now to the drawings, FIG. 9 shows a login window 304 that is accessed by the user of the client using a web browser 300. Each client that connects to the application server 3 using the login window 304 is given a unique session. The session timeout is thirty minutes, for example if the user does not interact with the application server for thirty minutes or longer the next interaction ends the session and returns the user to the login screen to start a new session. The user logs in by entering a user name 301 and a password 302 and clicking the login button 303.

Figure 10:
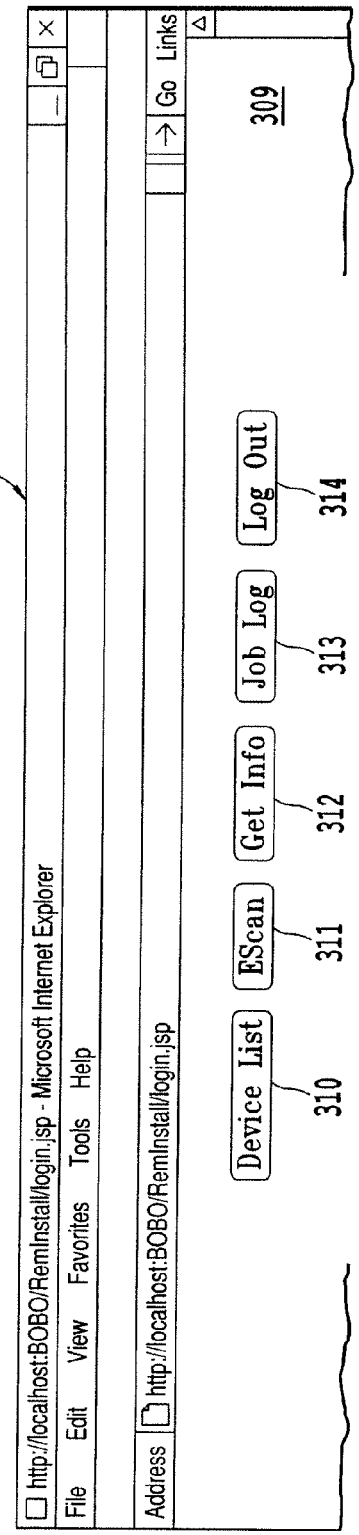
FIG. 10 is an exemplary web-based client interface in which a main menu window is displayed.

After successfully logging in, the first window the user sees is the main menu window 309 shown in FIG. 10. The main menu window 309 displays five buttons for user selection. It should be understood by one skilled in the art that a different number or style of buttons could be used in the main menu window 309. In the present example, the buttons available are a device list button 310, an Escan button 311, a getinfo button 312, a job log button 313 and a logout button 314.

Figure 11:
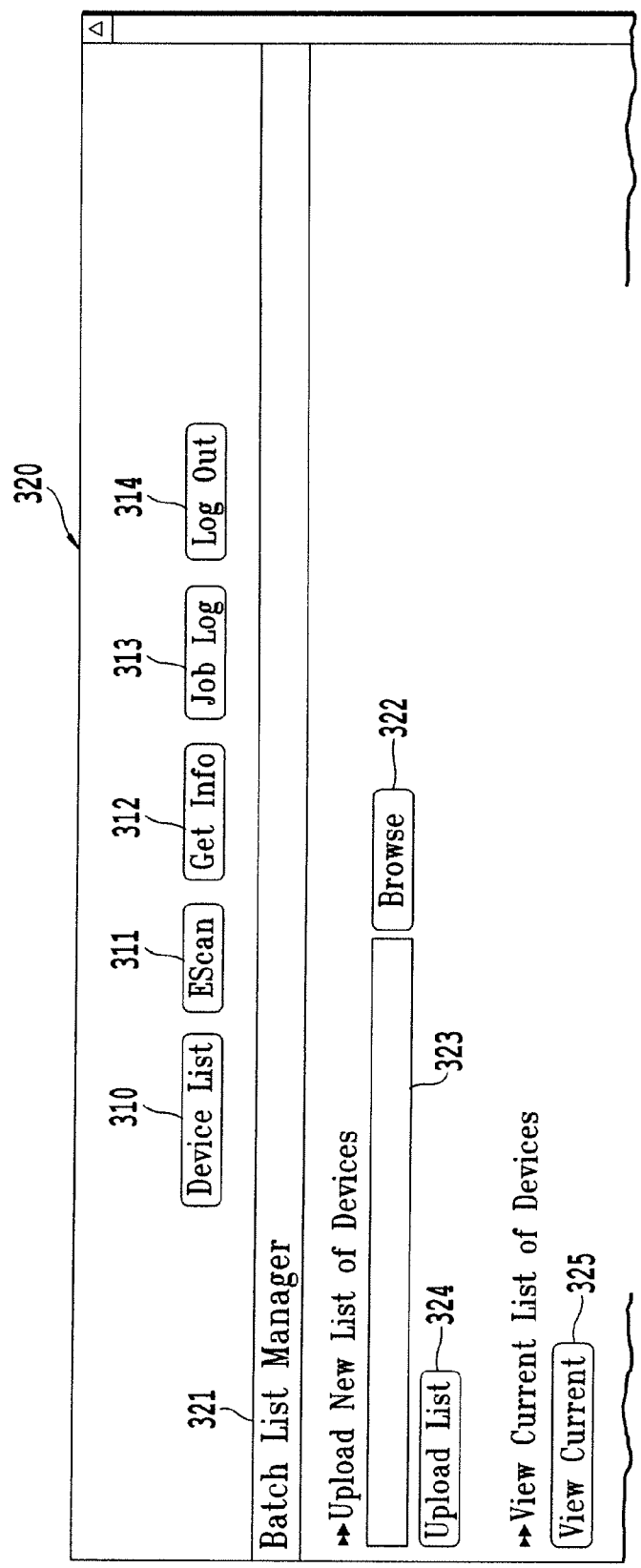
FIG. 11 is an exemplary web-based client interface in which the device list window is displayed.

Turning now to FIG. 11, FIG. 11 shows a device list window 320 that is displayed when the device list button 310 is pressed. The device list window 320 allows the user to upload a new list of MFPs. Using this window a user is able to browse a computer to locate the text file by clicking the browse button in 322. Once a text file is listed in text box 323, the upload list button 324 can be clicked on uploading the list from the client 1 to the application server 3. The view current button 325 allows the user to view a list of devices that are currently uploaded to the application server 3.

Figure 12:
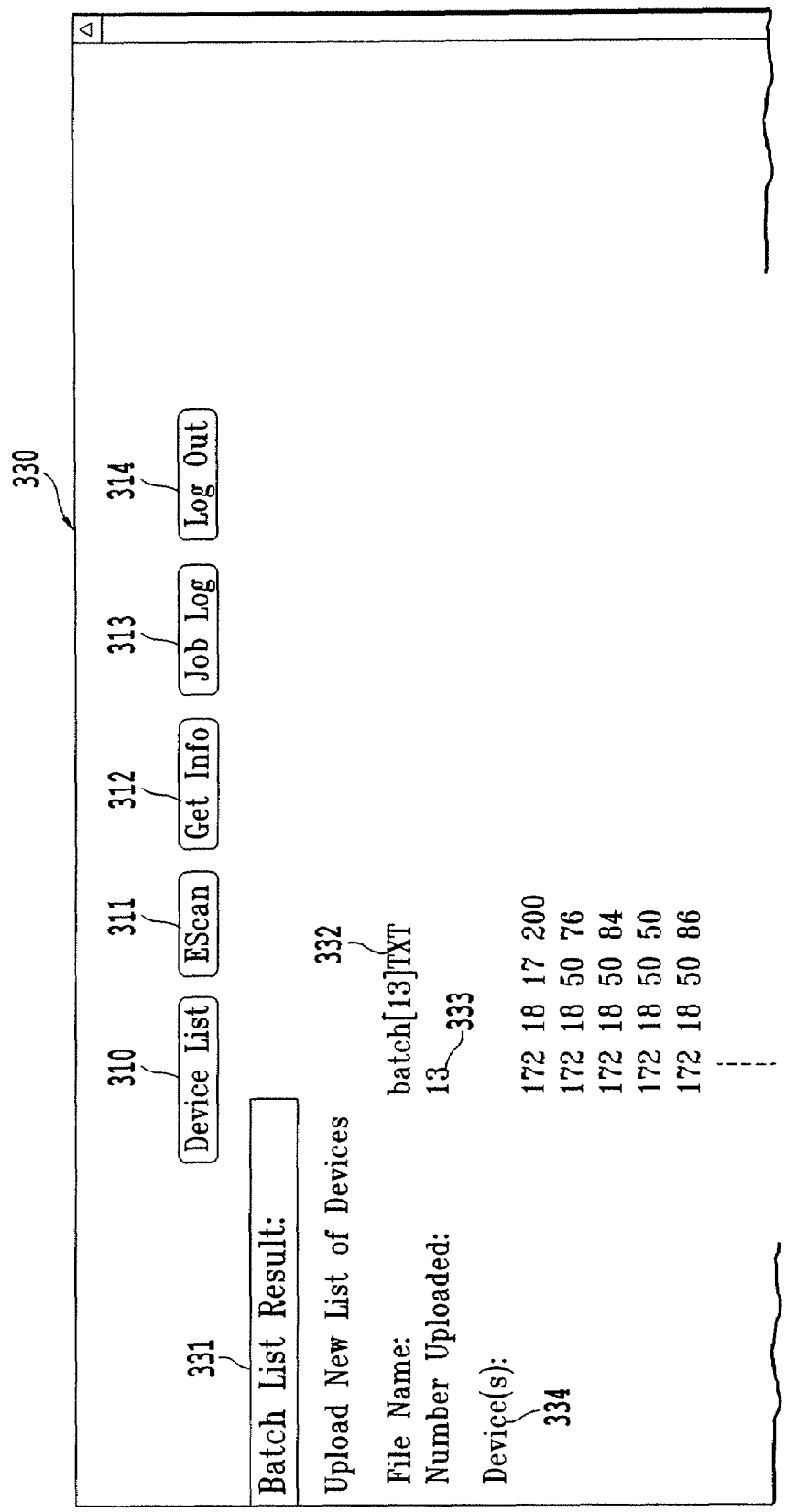
FIG. 12 is an exemplary web-based client interface in which the device list result window, after a device list has been uploaded, is displayed.

When the view current button 325 is pressed, the device list result window 330 shown in FIG. 12 is displayed. Device list result window 330 shows the file name of the text file that was uploaded to the application server 3, the number of devices that are currently uploaded 333, and the IP addresses 334 of the uploaded MFPs. It should also be noted that the device list 334 could also include host names.

Figure 13:
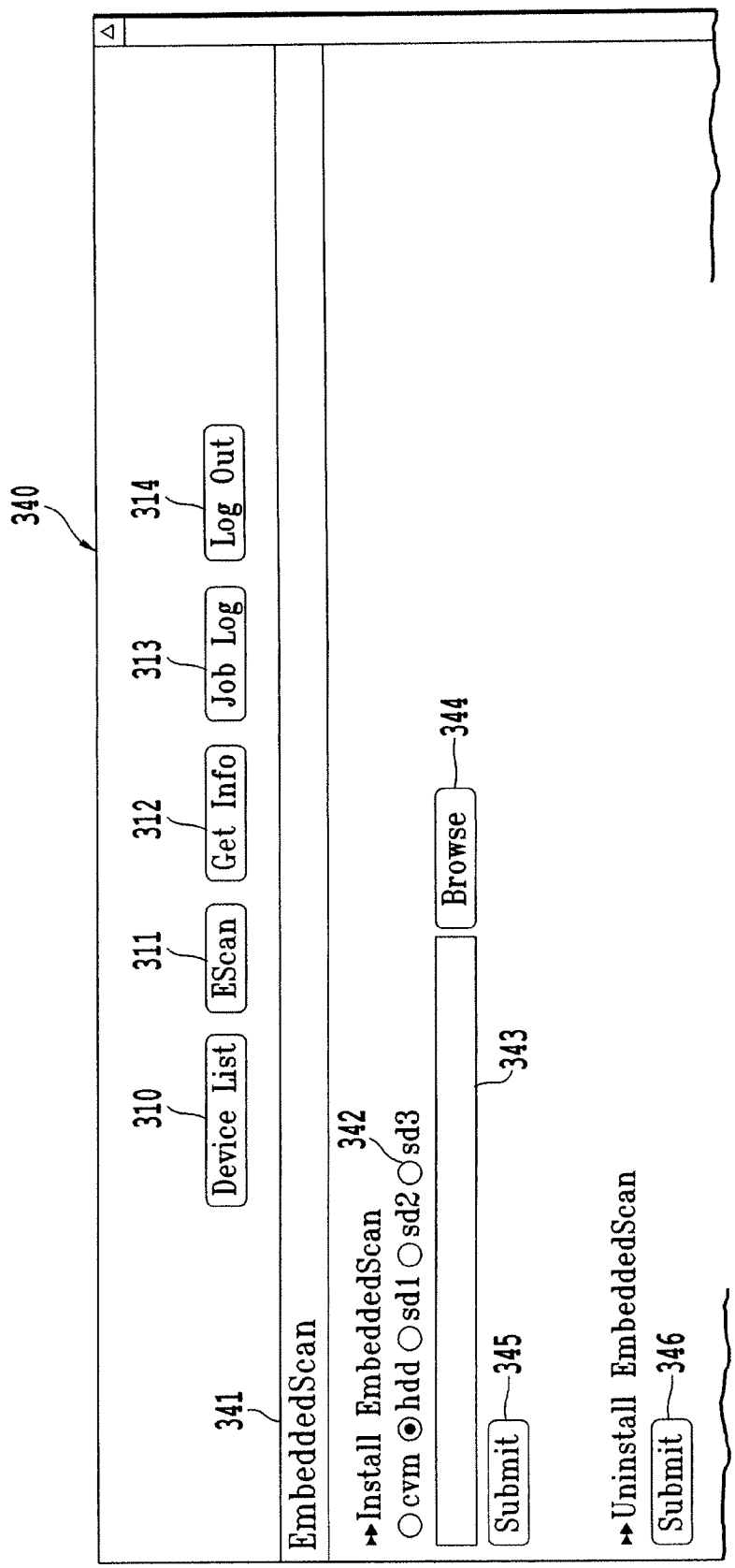
FIG. 13 is an exemplary web-based client interface in which the embedded scan window is displayed.

Turning now to FIG. 13, FIG. 13 shows an embedded scan window 340 which is displayed when the e-scan button 311 is pressed. The embedded scan window 340 allows a user to install the embedded scan program on the MFPs found in the device list or alternatively this window also allows the user to uninstall the embedded scan program from devices on the device list by clicking the submit button 346.

Figure 14:
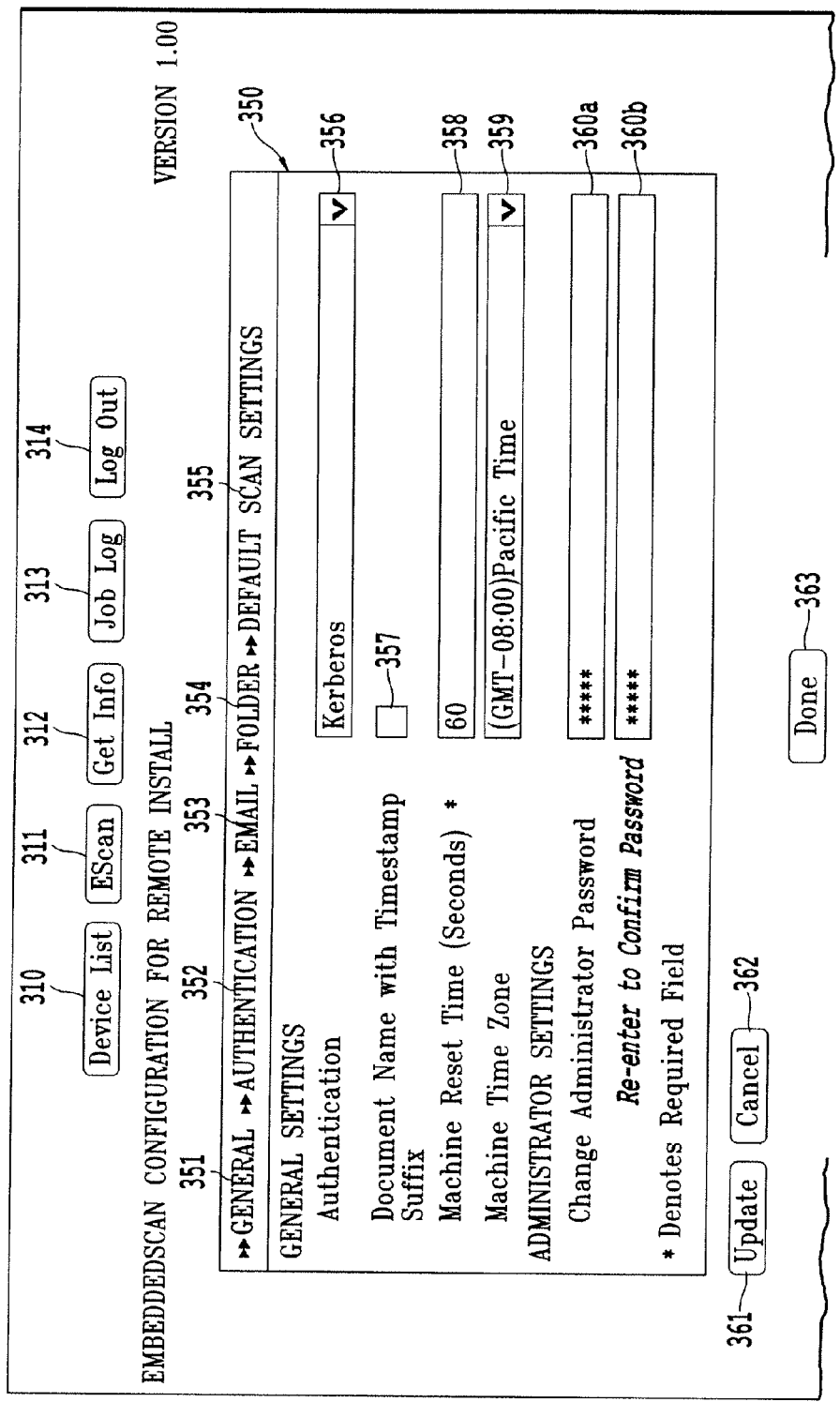
FIG. 14 is an exemplary web-based client interface in which the embedded scan configuration window is displayed.
Figure 15:
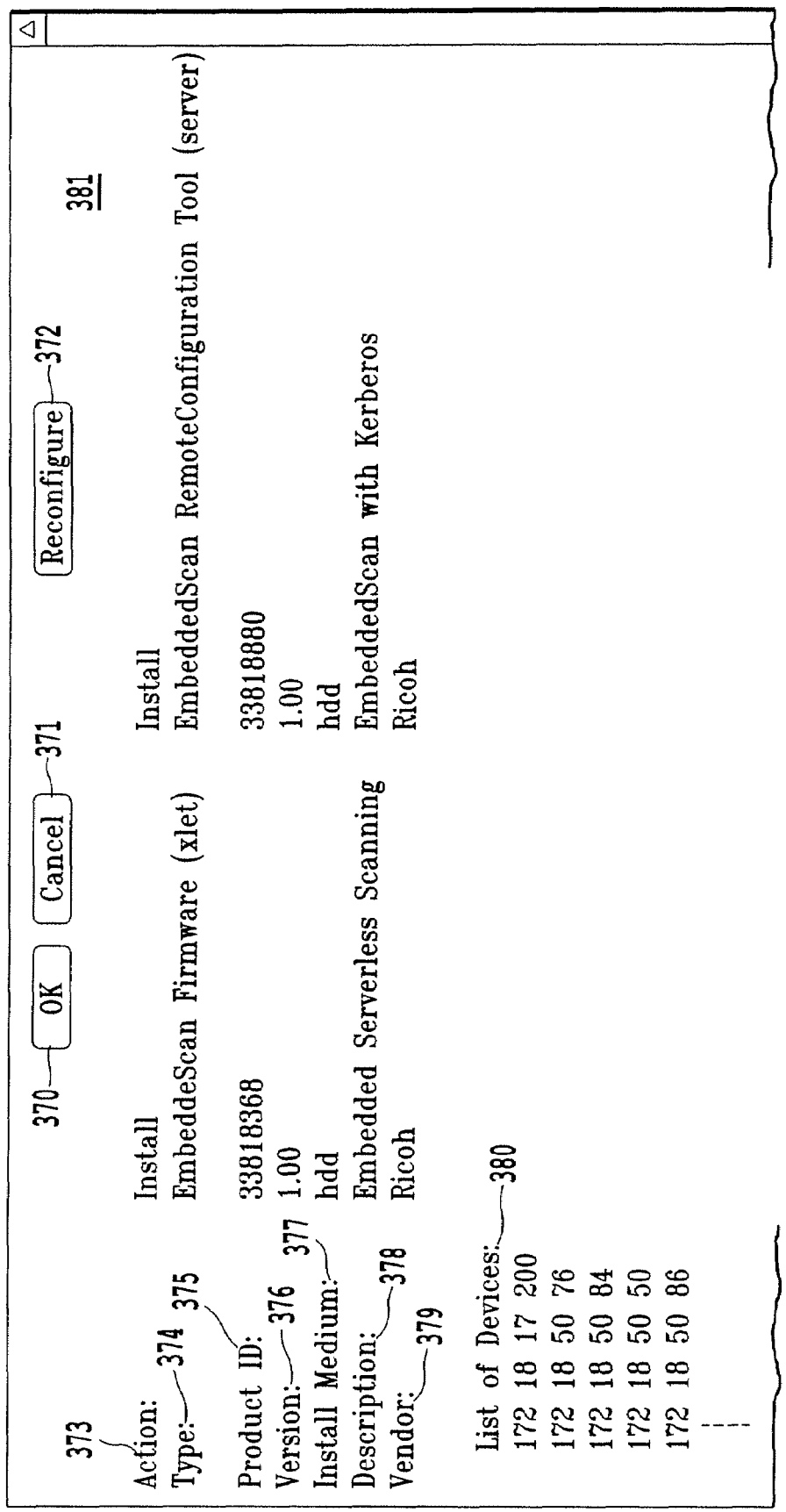
FIG. 15 is an exemplary web-based client interface in which the embedded scan installation confirmation window is displayed.

With respect to installing the embedding scan program, option 342 allows the user to decide where on the target MFP the embedded scan application will be installed. The options available are on the CVM, on the hard drive or on one of the SD slots. Once the user has decided where the embedded scan application will be installed, the user finds the location of the install package found on the client's local hard drive. In textbox 343, the name of the installed package is placed and in order to locate this install package the user can click the browse button 344 to search the local hard drive. Once the submit button 345 is clicked, the embed scan configuration window 350 shown in FIG. 14 is displayed.

The embedded scan configuration window 350 includes several configuration sub-windows. The sub-windows include a general window 351, an authentication window 352, an e-mail window 353, a folder window 354 and a default scan settings window 355. In this example, the general window 351 is displayed. The general settings window 351 allows the user to select the authentication method in the dropdown box 356, the document name with the time stamped suffix in check box 357, the machine reset time in text-box 358 and the machine time code in drop-down box 359. The administrator password settings are also included in the general window 351. The administrator password can be changed in index boxes 360a and 360b. Once the user has updated the settings, the update button 361 will save the changes and the cancel button 363 will clear the changes. Once the user has finished making changes, the done button 363 allows the user to advance to the embedded scan installation confirmation window 381 shown in FIG. 15.

In the embedded scan installation confirmation window 381 three buttons are available. The ok button 370, which allows the user to run the action summarized in the embedded scan installation confirmation window 381. The cancel button 371, which returns the user to the embedded scan window 340 found in FIG. 13. The reconfigure button 372, returns the user to the embedded scan configuration window 350 found in FIG. 14. The summary found in the embedded scan installation confirmation window 381 has several different fields. The first field is the action field 373, this field shows the type of action being accomplished, in this example the action is install. The type field 374 shows which embedded scan component is being installed. In this example the xlet/server components to be installed are the embedded scan firmware and the embedded scan remote configuration tool. The product ID field 375 shows the product ID number of the installed component. Version field 376 shows the version of the component being installed. The install medium field 377 shows the destination of the installation, in this example, the hard drive of the MFP is the destination.

The description field 378 gives the description of the application. For example, the embedded scan firmware xlet is described as Embedded Serverless Scanning and the embedded scan remote configuration tool server is described as EmbeddedScan with Kerberos.

The vendor field in 379 shows which company created the program, in this example Ricoh is the vendor. In the list of devices 380 field the devices on which the install job will be performed are listed. If the user clicks the OK button 370 the embedded scan installation job status window 390 shown in FIG. 16 is displayed.

In the embedded scan job status window 390 it is possible to track the status of the installation process for each MFP 4 found in the list of devices. In the job status 391 field the install relation process describes that the job is in the process of running at the moment. The update button 392 refreshes the status of the job. The update button 392 can be selected until the job is complete. The device field 393 lists the name or IP address of the individual MFPs 4a . . . n on which the job is running.

The status field shows the individual status of each MFP 4a . . . n. Three options are available in the status field 394 running, success or failed. The success and failed options are displayed when the installation job is complete for that device. The communication step field 395 shows which communication step the MFP is currently processing. In the embedded scan installation example, there are nine possible communication steps. The attempts current step field 396 involves retries during network failures, the number displayed represents the number of attempts the system has attempted in the communication step displayed in the communication step field 395. Finally the failure description field 397 provides detail describing a failure when it occurs.

When the job is completed the window changes and the embedded scan installation job result window 400 shown in FIG. 17 is displayed. When the job is complete, the job status field 391 is set as completed and if the process failed on any MFP, the number of failures is listed and a warning is shown in field 401.

The device field 393 shows the host name or IP address of the MFP and the status of the device is. As the job status is now completed the status shown in field 394 must either be success or failed. The elapsed time of the process is shown in field 395 and the failed communication step, if one exists, is shown in field 396. The failed communication step field notes on which communication step the process failed. Finally the failure description field 397 gives a description of why the process failed.

Figure 18:
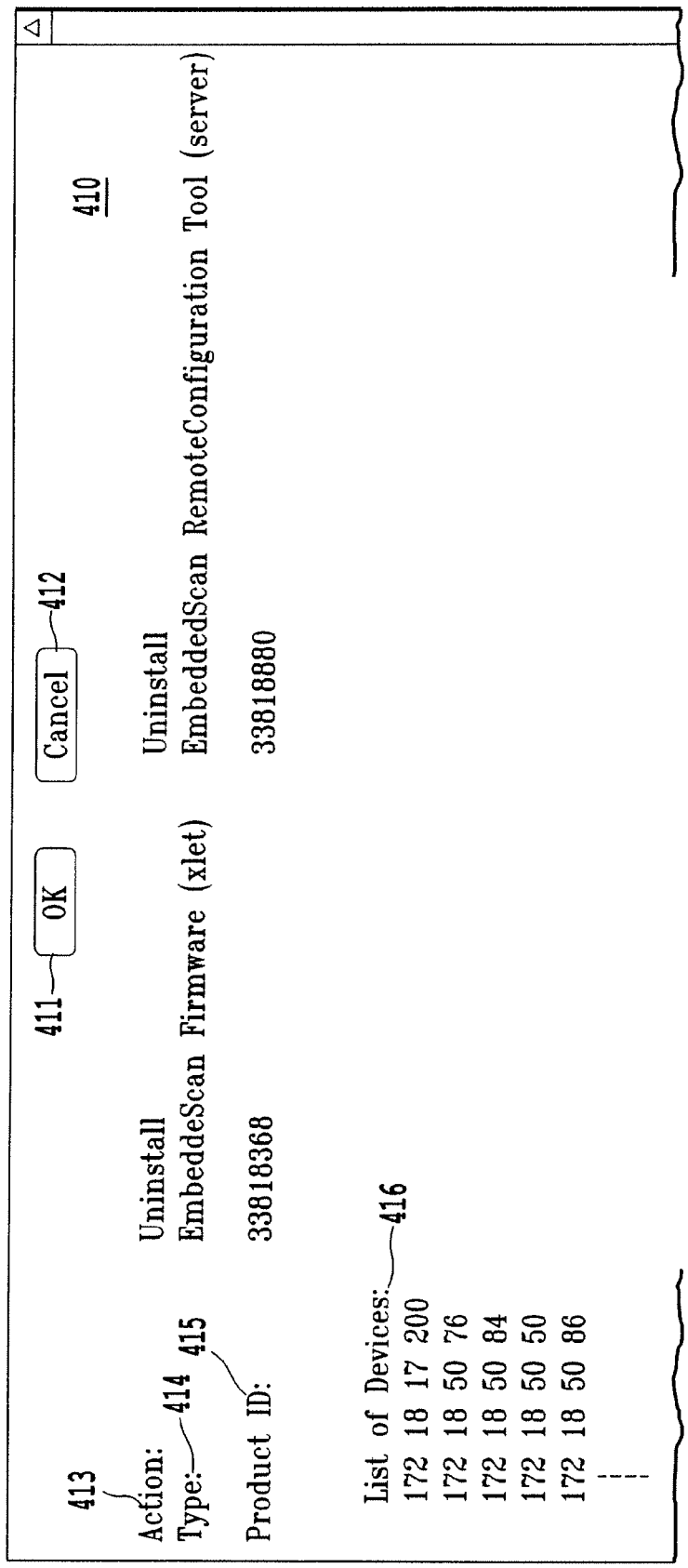
FIG. 18 is an exemplary web-based client interface in which the embedded scan uninstall confirmation is displayed.

Returning to FIG. 13, when the user clicks the uninstall submit button 346 the embedded scan uninstall confirmation page 410 shown in FIG. 18 is displayed. In the embedded scan uninstall confirmation page 410, two buttons are available an ok button 411 and a cancel button 412. The ok button 411 runs the action summarized in the embedded scan uninstall confirmation window 410 and the cancel button returns to the embedded scan window 340 found in FIG. 13. In the embedded scan uninstall confirmation window 410 several fields are displayed. The action field 413 shows what action is being done, in this example uninstall is being performed. The type field 414 describes the name of embedded scan component that is being uninstalled. The product ID field 415 shows the product ID of the component to be uninstalled and the list of devices field 416 provides a list of the host names or IP addresses of the MFPs 4 from which the embedded scan application is being uninstalled.

Figure 19:
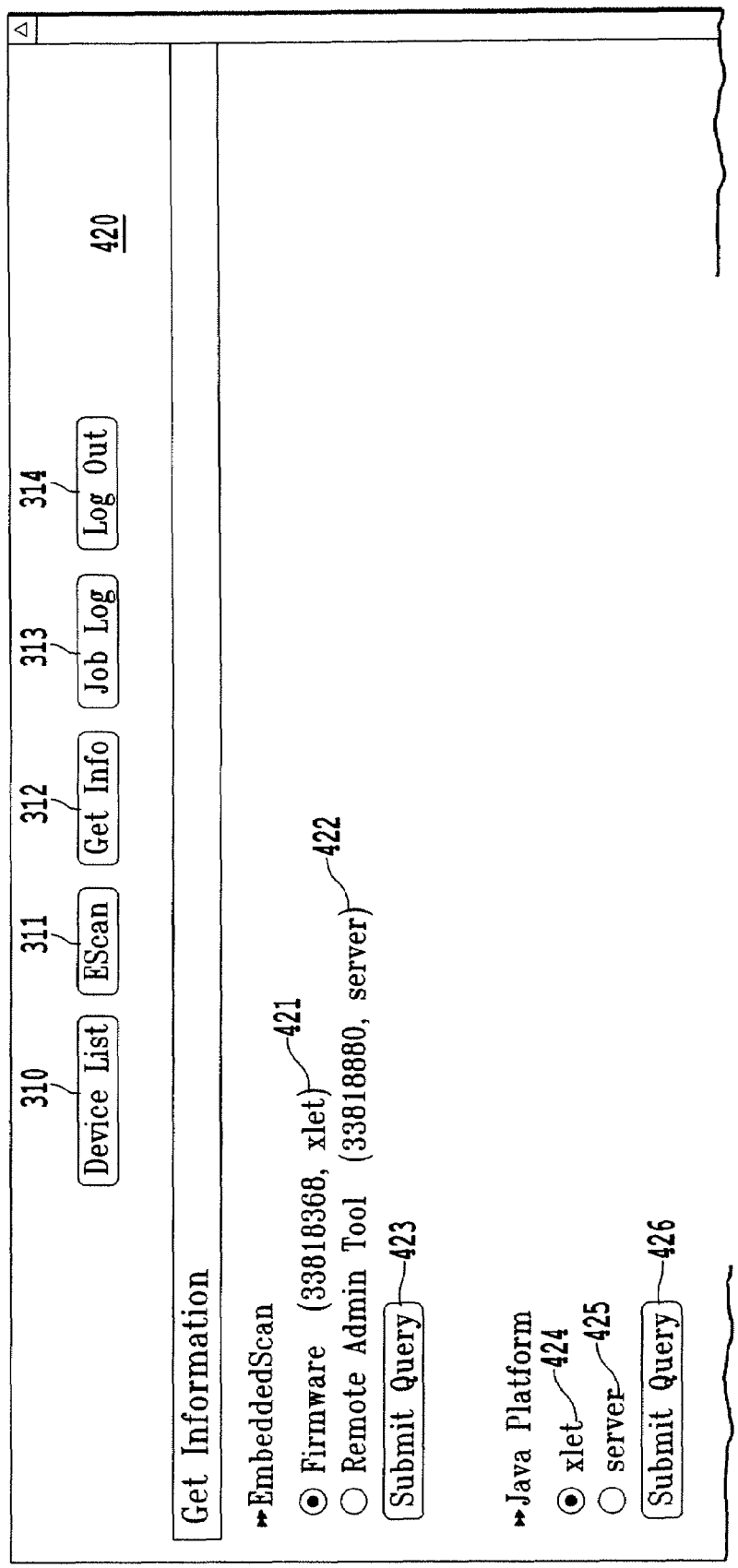
FIG. 19 is an exemplary web-based client interface in which the get information window is displayed.

Turning now to FIG. 19, this figure shows an example of the get information window 420 which is displayed when the get info button 312 is pressed. The purpose of the get information window 420 is enable the user to query whether the embedded scan firmware component or server component is either installed or uninstalled for each MFP 4 found in the device list. If the embedded scan component is installed, information about the install firmware on the MFP can be accessed. Further information about the java platform xlet/server component for each MFP on the list can also be accessed.

Figure 20:
FIG. 20 is an exemplary web-based client interface in which the get information status window is displayed.

When querying the embedded scan application two options are available, first the firmware 421 or the remote admin tool 422. The firmware is the xlet application 421 and the remote admin tool is a server application 422. When the user selects one of the two options and clicks the submit query button 423 the get information status window 430 shown in FIG. 20 is displayed.

The job status field 432 displays the status of the job, in this example the job is running. The update button 433 allows the user to update the status of the installation, updating the window. The device field 434 lists the name of the MFPs 4a . . . n found in the device list and which the get info query is being run against. The status of the query 435 is found in the status field 435 and the current communication step 436 is we found in communication step field 436.

In this example two communication steps are available, contacting the agent and closing the panel lock. The current step attempts field 437 lists the number of attempts at a current step and the failure description field 438 lists description about a failure if the get info query fails. Once the job is completed the get information result window 440 shown in FIG. 21 is displayed. The job status field 441 is displayed as completed and the number of failures and a warning if a failure existed are shown in the field 442. The device field 434 lists the host names or IP addresses of the MFPs 4a . . . n and the status field 435 lists the status of the query. Two options are available for the status field, success or failure. The elapsed time field 443 lists how long the query took to complete. The failed communication step field 444 lists on which step the communication failed, if the communication resulted in a failure. Finally, the result field 445 lists detailed information about the installed component queried from the get information window 420 found in FIG. 19.

Returning to FIG. 19, it should be noted that similar get information status and result windows are displayed when the java platform options 424 and 425 are selected and a submit query 426 is clicked. Similar results are also displayed when the Remote Admin Tool option 422 is selected and the submit query button 423 is clicked.

Turning now to FIG. 22, this Figure illustrates the job log window 450 displayed when the java log button 313 is clicked. The job log window 450 includes the job start time shown in field 451. The user field 452 includes the unique ID number of the user session and enables different sessions to be distinguished. The job field 453 includes the name of the job that was run against the MFP 4 as well as login and log off and upload device list functions if these functions were run.

The device field 454 includes the host name or IP address of the MFP 4 on which the job was run. The result filed 455 lists if the job was a success or failure. The duration field 456 shows the duration of the job and the job settings field 457 lists the settings the user chose before running the job. In the case that the job was an upload device list job the job settings field 457 displays the name of the upload file. The failure description field 458 lists a detailed technical failure description which notes why the job failed and the timeout amount of the job.

Finally, in the case of failure the post info field 459 lists the step on which the job failed. Alternatively, in the case that the get info command was rune, whether the component was installed or uninstalled is listed in the Post-info field 459.

Figure 23:
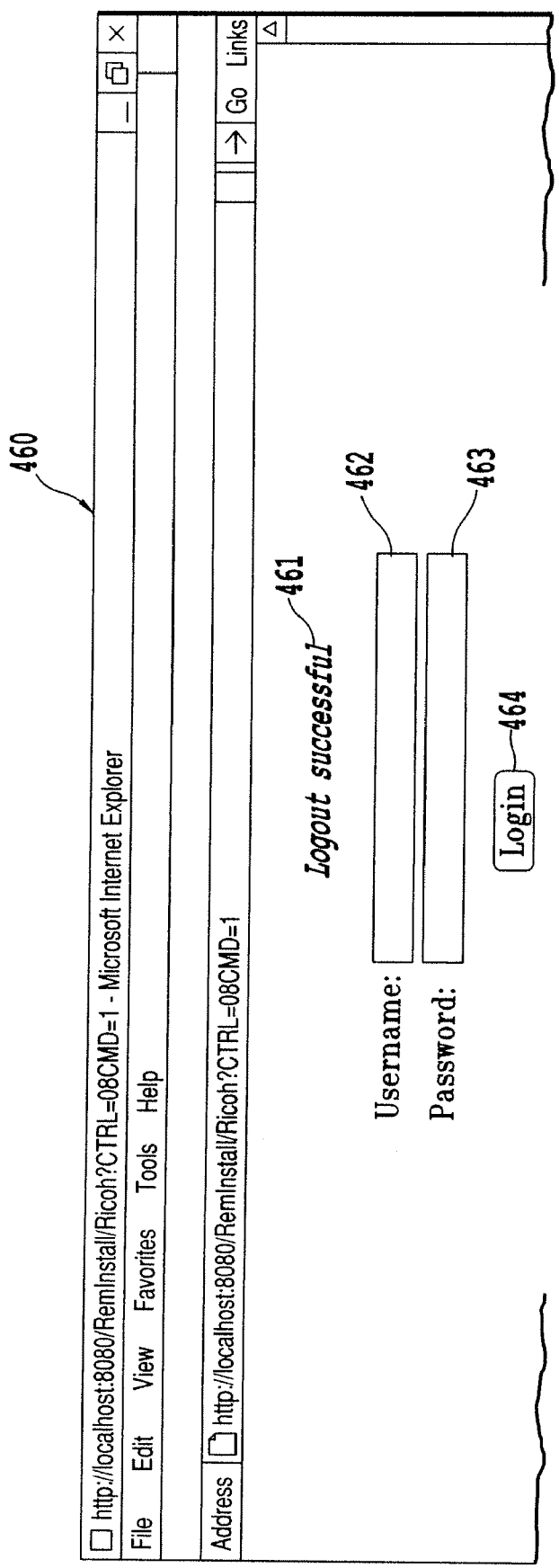
FIG. 23 is an exemplary web-based client interface in which the logout window is displayed.

Finally turning to FIG. 23, when the logout button 314 is pressed the logout window is displayed 460. The logout window states if the logout was successful in 461 and clears all information related to the user session. The logout window also includes a user name 462 and password fields 463 and a login button 464 to allow the user to re-login.

Figure 24:
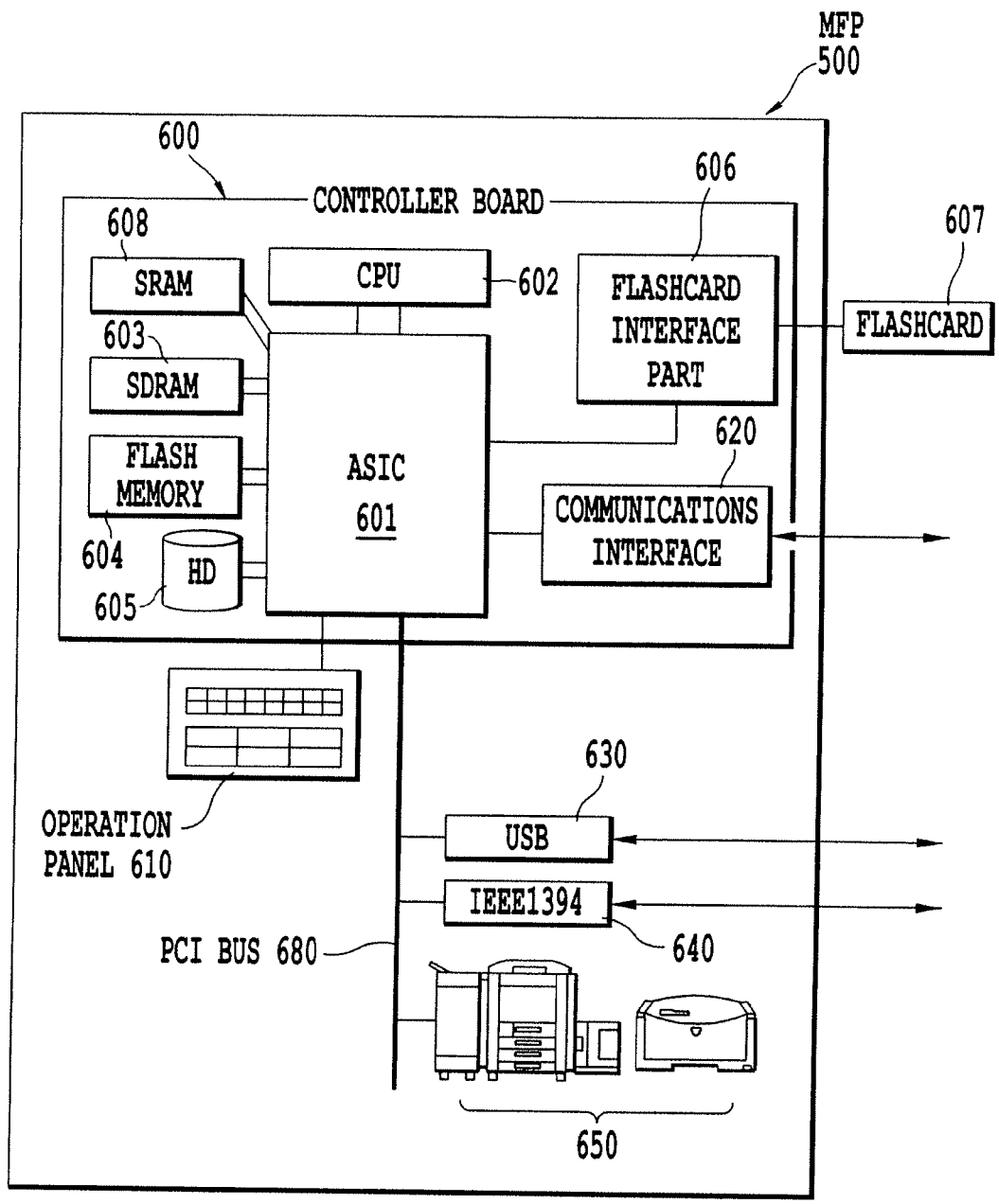
FIG. 24 is a hardware configuration of the image forming apparatus according to an embodiment of the present invention.

FIG. 24 shows an example of a hardware configuration of the MFP 500 according to an embodiment of the present invention. As shown in FIG. 24, the MFP 500 includes a controller board 600, an operation panel 610, a fax control unit (FCU) 620, a USB 630, an IEEE 1394 port 640, and a printer 650. It should be also noted that other types of i/o interfaces could be included including IEEE 1394b, USB 2.0. The controller board 600 includes a CPU 602 for processing and several storage devices such as SDRAM 603, SRAM 608, flash memory (flash ROM) 604, flash card interface part 606 and HD 605 used to store data associated with the MFP 500. Each of these components are connected to the ASIC 601, the ASIC 601 is an application specific integrated circuit that is designed specifically for use in a MFP 500. Other types of storage devices are also possible as well as other types of data processors and integrated circuits.

The operation panel 610 is directly connected to the ASIC 601 as is the communications interface 620. The communications interface 620 can also be connected to a network or any other similar type communications medium. The USB 630, the IEEE 1394 640 and the multi-function printer functions 650 such as scanning, printing, and faxing are connected to the ASIC 601 via the PCI bus 680.

The SRAM 608 is a nonvolatile RAM, other types of SRAM are also possible. A flashcard 607 can be inserted into a flash card interface part 606, so that data is sent/received between the ASIC 601 and the flashcard 607 via the flash card interface part 606.

The operation panel 610 includes an operation part used for key operation such as key input and button pushing and the like by the user, and a display part for displaying drawing data such as various screens. It should be appreciated that other types of hardware components can be used in the present invention.

Further with respect to a computer readable medium such as a floppy disk, magnetic tape, CD-ROM and the like, by installing the program stored in the computer readable medium into an MFP, the MFP can perform the functions of the present invention.

This invention has been described with respect to a multi-function printer, but is applicable to any image handling device such as a copier, digital copier, printer, scanner, digital camera, fax machine, or multi-function printer or any combination thereof. A general purpose computer is not considered an image handling device. Moreover, the invention is applicable to other special purpose devices such as navigation systems, global positioning systems, vending machines, metering systems, machine tools and other tools which operate using programming or a programmed processor, automobiles, other transportation devices such as trains, motorcycles, planes, or boats, radar systems, radios, MP3 players, digital music players, and other audio systems, mobile phones, other communication devices and systems, and any other special purpose device which operates using a plug-in.

The present invention is not limited to the specifically disclosed embodiments, and variations and modifications may be made without departing from the scope of the present invention.

What is claimed is:

1. A server for dynamically managing software functionality of a plurality of non-general purpose computing devices via a network, comprising:
    an interface operably linked to the network for receiving a management request including an identification file of a client device distinct from the plurality of non-general purpose computing devices designating selected ones of the plurality of non-general purpose computing devices, and a modification package for distribution to the selected ones of the plurality of non-general purpose computing devices;
    a memory configured to store the identification file and the modification package; a management agent responsive to the management request configured to access the identification file and establish communication with a corresponding deployment agent of the selected ones of the plurality of non-general purpose computing devices via the interface to negotiate a network transfer of the modification package for installation thereto, the transfer being initiated with the selected ones of the deployment agents based upon a status indication provided by the corresponding deployment agent of the selected ones of the plurality of non-general purpose computing devices,
    wherein, transfer of the modification package is not initiated with deployment agents currently indicating a status of processing a previously initiated management request, and, transfer is initiated with deployment agents currently indicating an available status,
    Wherein, the modification package is a compressed file, and
    wherein, the management agent decompresses the modification package to build a boot script corresponding thereto, and recompresses the modification package to include the boot script for transfer to the non-general purpose computing devices for installation.

2. The server according to claim 1, wherein the interface includes a web based front end for receiving the management request.

3. The server according to claim 2, wherein the management request is provided from the client device as an HTTP post.

4. The server according to claim 1, wherein the identification file includes IP addresses of the selected ones of the plurality of non-general purpose computing devices.

5. The server according to claim 1, wherein the management agent executes on a Java platform of the server.

6. The server according to claim 5, wherein the deployment agent is a Java servlet application responding to HTTP communications of the server.

7. A distribution node for dynamically managing software functionality of a plurality of non-general purpose computing devices via a network, comprising:

a graphical user interface operably linked to the network for receiving a management request including an identification file of a client device distinct from the plurality of non-general purpose computing devices designating selected ones of the plurality of non-general purpose computing devices, and a modification package for distribution to the selected ones of the plurality of non-general purpose computing devices;

a memory configured to store the identification file and the modification package; management means for accessing the identification file and for establishing communication with a corresponding deployment agent of the selected ones of the plurality of non-general purpose computing devices in response to a management request, for negotiating and performing a network transfer of the modification package to the corresponding deployment agent, the transfer being initiated with the selected ones of the deployment agents based upon a status indication provided by the corresponding deployment agent of the selected ones of the plurality of non-general purpose computing devices, to install the modification package thereto, wherein, transfer of the modification package is not initiated with deployment agents currently indicating a status of processing a previously initiated management request, and, transfer is initiated with deployment agents currently indicating an available status, Wherein, the modification package is a compressed file, and Wherein, the management means decompresses the modification package to build a boot script corresponding thereto, and recompresses the modification package to include the boot script for transfer to the deployment agents for installation.

8. A method of dynamically managing software functionality of a plurality of non-general purpose computing devices via a network, comprising:

receiving a management request including an identification file of a client device distinct from the plurality of non-general purpose computing devices designating selected ones of the plurality of non-general purpose computing devices, and a modification package for distribution to the selected ones of the plurality of non-general purpose computing devices, wherein the modification package is a compressed file;

storing the identification file and the modification package;

accessing the identification file with a management agent in response to the reception of the management request;

establishing communication between the management agent and a corresponding deployment agent of the selected ones of the plurality of non-general purpose computing devices via the interface;

receiving a status designation from each of the selected ones of the plurality of non-general purpose computing devices via a corresponding deployment agent;

delaying the transfer of the modification package with deployment agents currently indicating a status of processing a previously initiated management request;

initiating transfer of the modification package with deployment agents currently indicating an available status;

decompressing the modification package;

building a boot script corresponding to the modification package;

recompressing the modification package to include the boot script; and transferring the recompressed modification package to the non-general purpose computing devices for installation.

9. The method according to claim 8, wherein the interface includes a web based front end for receiving the management request.

10. The method according to claim 9, wherein the management request is provided from the client device as an HTTP post.

11. The method according to claim 8, wherein the identification file includes IP addresses of the selected ones of the plurality of non-general purpose computing devices.

12. The method according to claim 8, wherein the management agent executes on a Java platform of the server.

13. The method according to claim 12, wherein the deployment agent is a Java servlet application responding to HTTP communications of the management agent.

14. The method according to claim 8, wherein the modification package upon installation, causes an un-installation of executable code at the plurality of non-general purpose computing devices.

* * * * *